(12) United States Patent
Arnold et al.

(10) Patent No.: US 7,458,221 B1
(45) Date of Patent: Dec. 2, 2008

(54) VARIABLE AREA NOZZLE INCLUDING A PLURALITY OF CONVEXLY VANES WITH A CROWNED CONTOUR, IN A VANE TO VANE SEALING ARRANGEMENT AND WITH NONUNIFORM LENGTHS

(75) Inventors: Steven M. Arnold, Bath, OH (US); Nicholas Penney, Kent, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 854 days.

(21) Appl. No.: 10/693,850

(22) Filed: Oct. 23, 2003

(51) Int. Cl.
*F02K 1/00* (2006.01)
(52) U.S. Cl. ............... 60/771; 239/265.39; 181/213
(58) Field of Classification Search ............ 60/770, 60/771, 228, 232, 39.5; 239/265.19, 265.35, 239/265.39; 181/213
See application file for complete search history.

(56) References Cited

U.S. PATENT DOCUMENTS

| | | | | |
|---|---|---|---|---|
| 2,984,068 | A * | 5/1961 | Eatock | 239/127.3 |
| 3,153,319 | A * | 10/1964 | Young et al. | 239/265.19 |
| 3,263,417 | A * | 8/1966 | Hooker | 60/771 |
| 3,568,792 | A * | 3/1971 | Urquhart | 181/215 |
| 3,648,800 | A * | 3/1972 | Hoerst | 181/213 |
| 3,670,964 | A * | 6/1972 | Pedersen | 239/265.19 |
| 3,730,436 | A * | 5/1973 | Madden et al. | 239/265.39 |
| 3,739,984 | A * | 6/1973 | Tontini | 239/265.17 |
| 3,767,120 | A * | 10/1973 | Harmon | 239/265.39 |
| 3,792,815 | A * | 2/1974 | Swavely et al. | 239/265.39 |
| 3,794,244 | A | 2/1974 | McMath | |
| 3,875,742 | A * | 4/1975 | McMurtry et al. | 60/226.2 |
| 3,892,358 | A * | 7/1975 | Gisslen | 239/265.39 |
| 3,954,225 | A * | 5/1976 | Camboulives et al. | 239/265.41 |
| 3,989,192 | A * | 11/1976 | Enderle et al. | 239/265.35 |
| 4,128,208 | A * | 12/1978 | Ryan et al. | 239/265.39 |
| 4,994,660 | A * | 2/1991 | Hauer | 239/265.41 |
| 5,039,014 | A * | 8/1991 | Lippmeier | 239/265.39 |
| 5,076,496 | A * | 12/1991 | Lippmeier | 239/265.41 |
| 5,120,005 | A * | 6/1992 | Reedy | 244/113 |
| 5,261,605 | A * | 11/1993 | McLafferty et al. | 239/265.35 |
| 5,273,213 | A * | 12/1993 | Lewis | 239/265.39 |
| 5,437,411 | A * | 8/1995 | Renggli | 239/265.39 |
| 5,484,105 | A * | 1/1996 | Ausdenmoore et al. | 239/127.3 |

(Continued)

FOREIGN PATENT DOCUMENTS

GB     2355766     5/2001

OTHER PUBLICATIONS

U.S. Appl. No. 10/693,853, filed Oct. 23, 2003, Arnold.

*Primary Examiner*—William H Rodriguez
(74) *Attorney, Agent, or Firm*—Woodling, Krost and Rust

(57) ABSTRACT

A variable area nozzle comprising a concentric support and a plurality of convexly contoured self sealing vanes is disclosed and claimed. The vanes are circumferentially and rotatably mounted to the concentric support forming a nozzle infinitely positionable between a first position corresponding to a minimum area nozzle and a second position corresponding to a maximum area nozzle. A closer, which is preferably a shape memory alloy (SMA), urges the nozzle toward the first position corresponding to a minimum area nozzle. Periodically spaced openers act between adjacent vanes to urge the nozzle to a second position corresponding to a maximum area nozzle.

60 Claims, 23 Drawing Sheets

U.S. PATENT DOCUMENTS

| | | | |
|---|---|---|---|
| 5,485,959 A * | 1/1996 | Wood et al. | 239/265.41 |
| 5,505,408 A * | 4/1996 | Speicher et al. | 244/52 |
| 5,771,902 A | 6/1998 | Lee et al. | |
| 5,794,850 A * | 8/1998 | Gutierrez, Jr. | 239/127.1 |
| 6,015,263 A | 1/2000 | Morris | |
| 6,192,671 B1 * | 2/2001 | Elorriaga | 60/230 |
| 6,276,126 B1 * | 8/2001 | Bouiller et al. | 60/232 |
| 6,306,671 B1 | 10/2001 | Silverbrook | |
| 6,314,721 B1 * | 11/2001 | Mathews et al. | 60/264 |
| 6,318,070 B1 | 11/2001 | Rey et al. | |
| 6,360,528 B1 * | 3/2002 | Brausch et al. | 60/262 |
| 6,487,848 B2 * | 12/2002 | Zysman et al. | 60/262 |
| 6,532,729 B2 * | 3/2003 | Martens | 60/204 |
| 6,718,752 B2 * | 4/2004 | Nesbitt et al. | 60/204 |
| 6,983,602 B2 * | 1/2006 | Senile | 60/771 |
| 6,993,914 B2 * | 2/2006 | Prouteau et al. | 60/771 |
| 7,013,650 B2 * | 3/2006 | Mandet | 60/771 |
| 7,028,462 B2 * | 4/2006 | Carper et al. | 60/230 |
| 7,032,835 B2 * | 4/2006 | Murphy et al. | 239/128 |
| 7,093,423 B2 * | 8/2006 | Gowda et al. | 60/204 |
| 7,117,682 B1 * | 10/2006 | Sevi et al. | 60/771 |
| 7,174,718 B2 * | 2/2007 | Bonnet et al. | 60/770 |
| 7,213,393 B2 * | 5/2007 | Lapergue et al. | 60/266 |
| 2002/0073691 A1 * | 6/2002 | Rey et al. | 60/226.1 |
| 2002/0121090 A1 * | 9/2002 | Zysman et al. | 60/770 |
| 2002/0125340 A1 * | 9/2002 | Birch et al. | 239/265.11 |
| 2003/0079744 A1 | 5/2003 | Bonney | |
| 2006/0086093 A1 * | 4/2006 | Dakowski et al. | 60/771 |
| 2007/0062199 A1 * | 3/2007 | Cowan et al. | 60/770 |
| 2007/0234728 A1 * | 10/2007 | Peters | 60/771 |

* cited by examiner

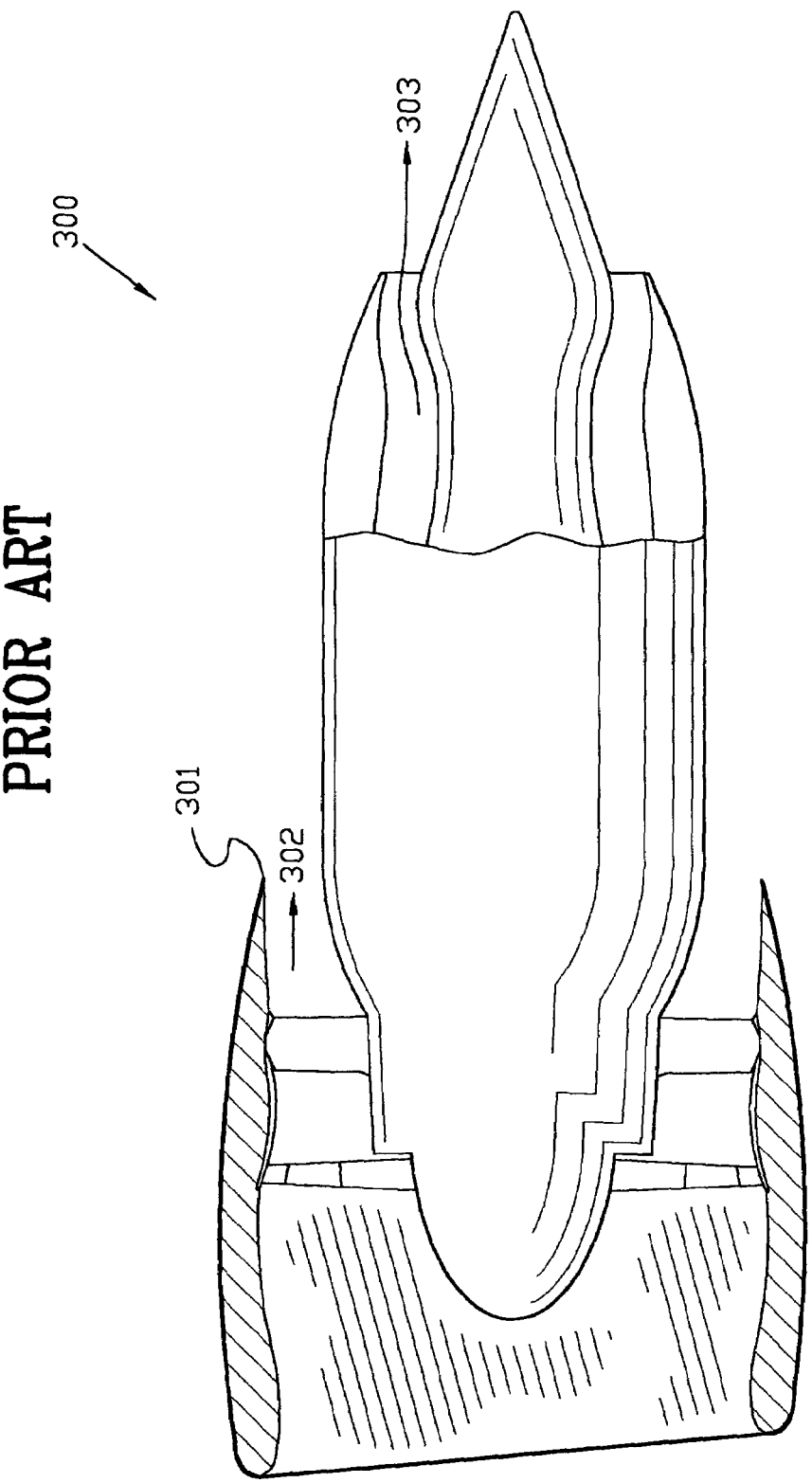

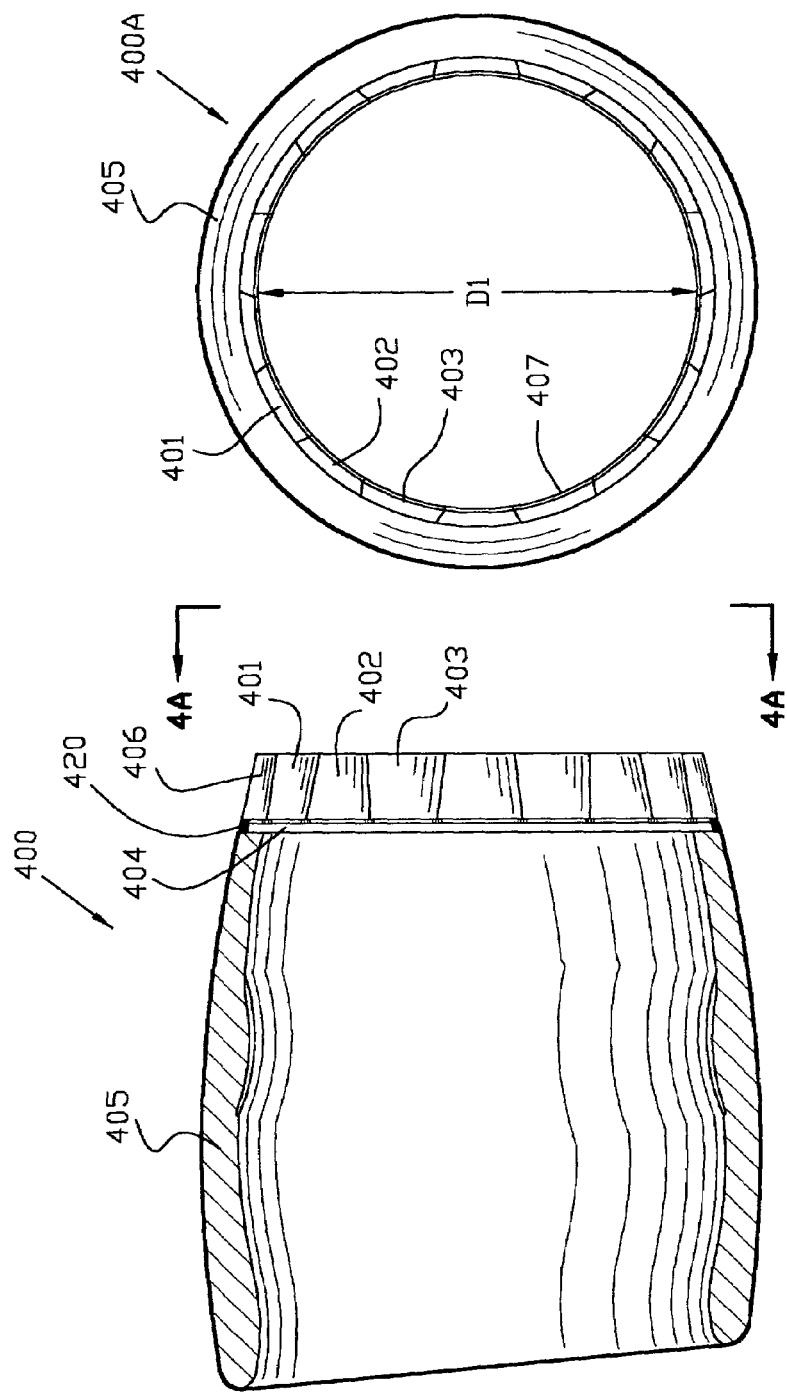

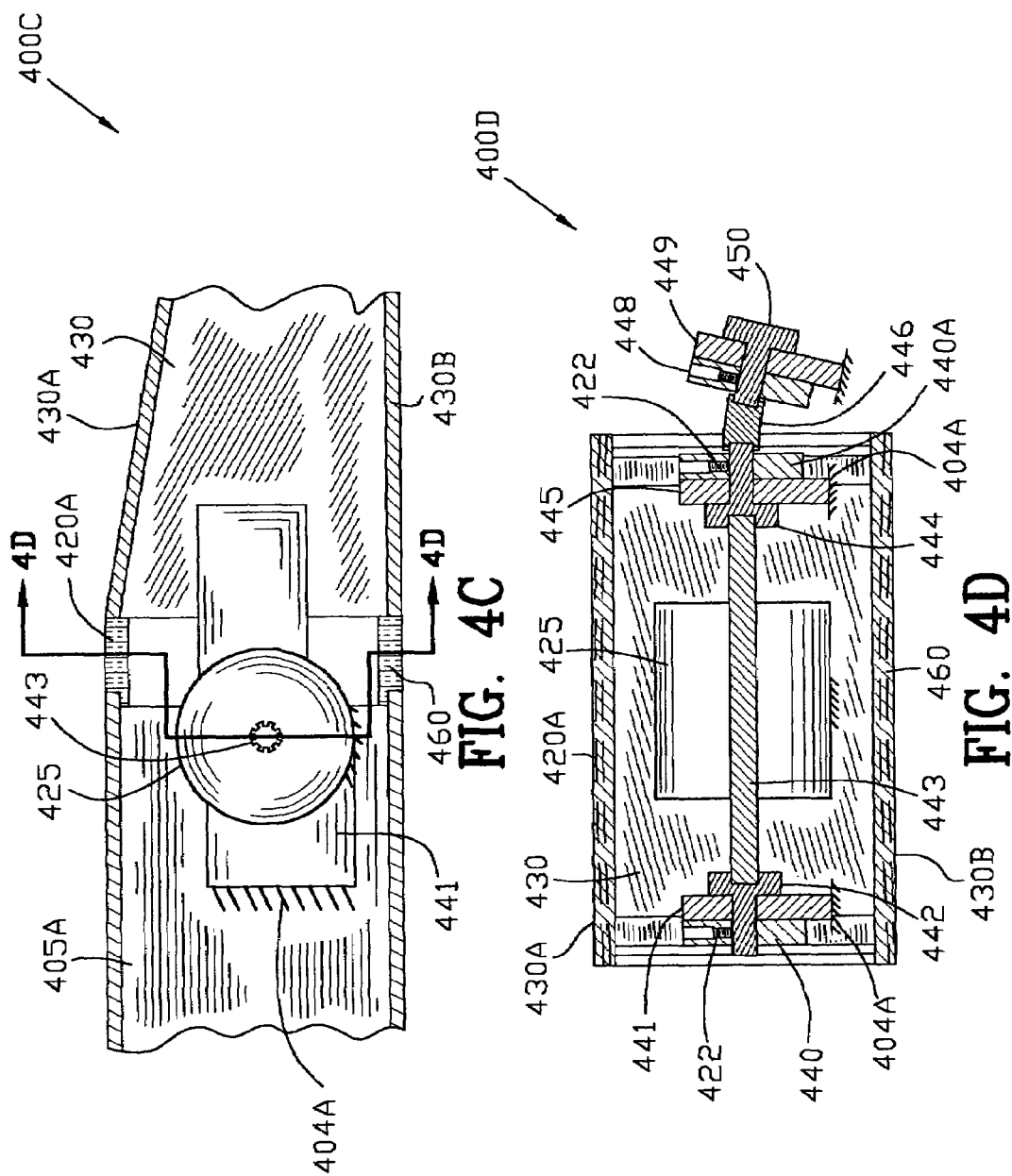

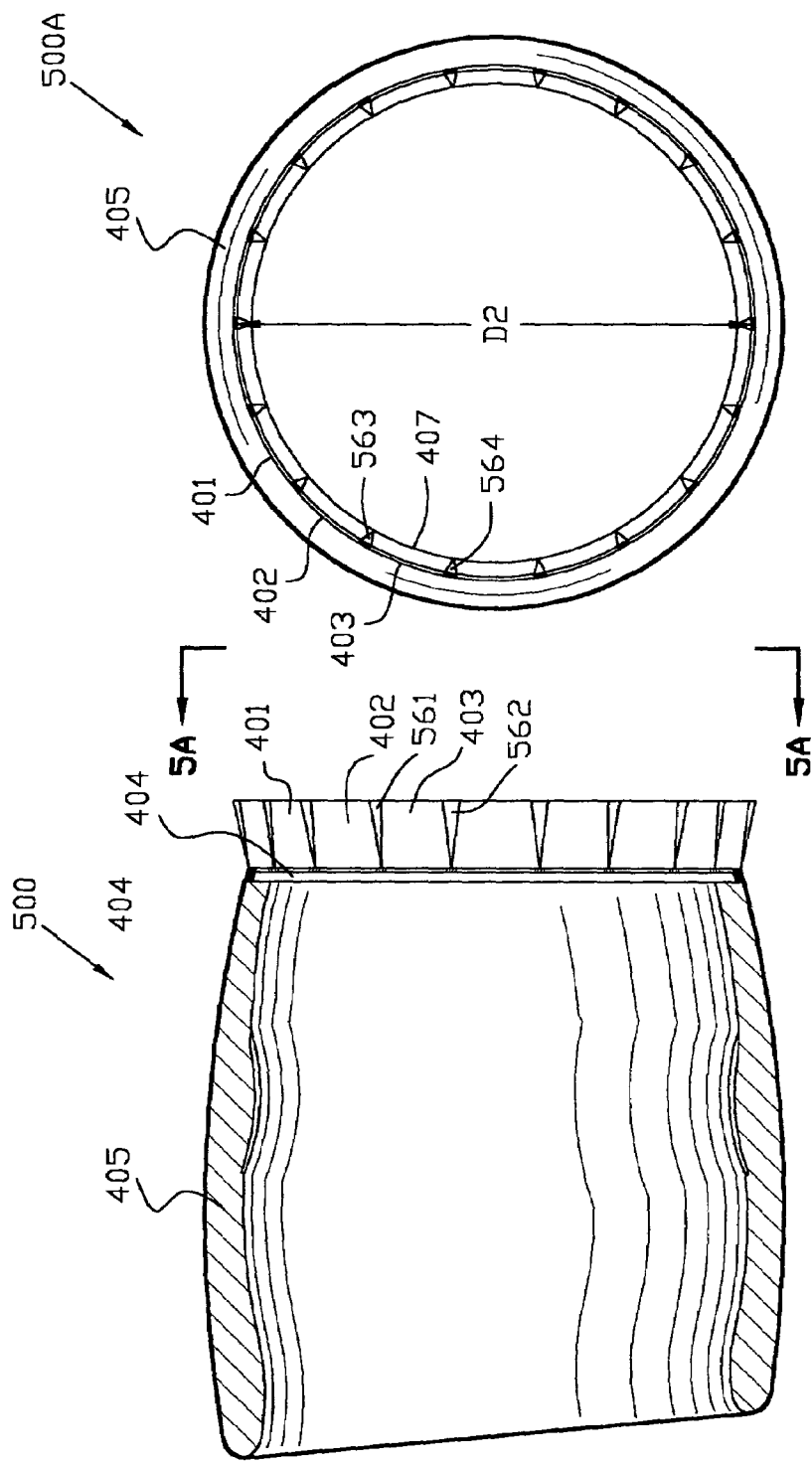

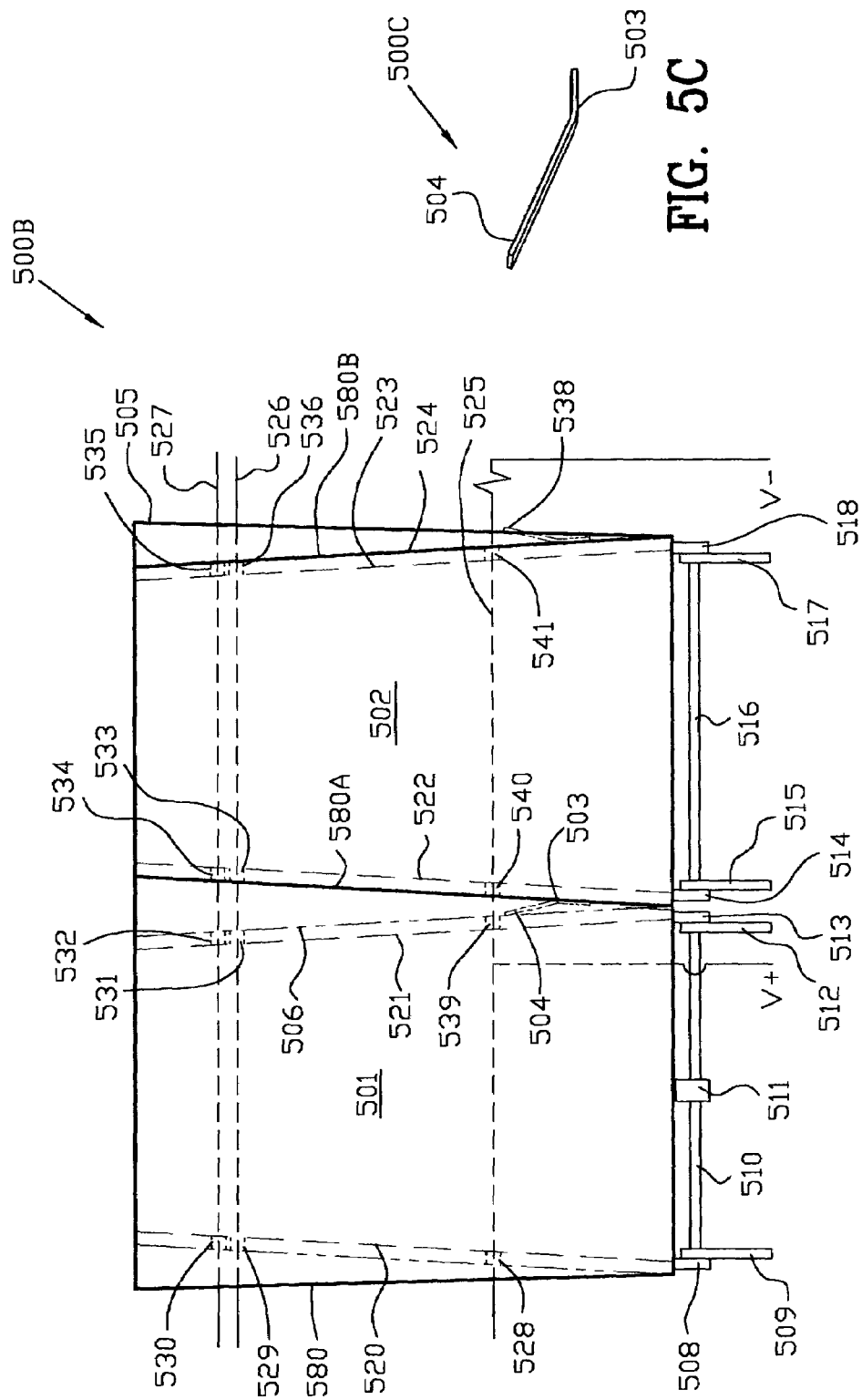

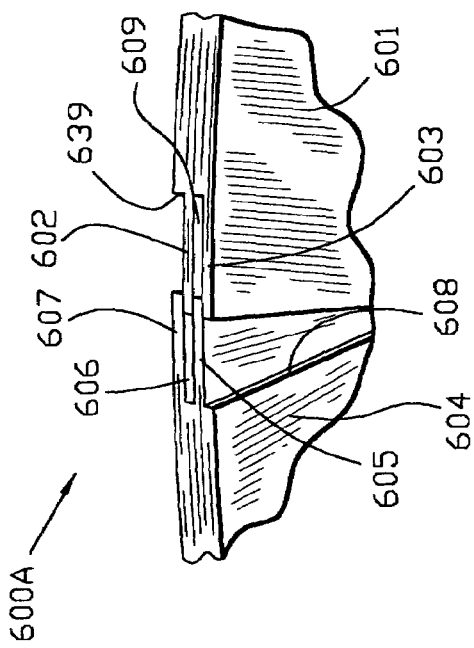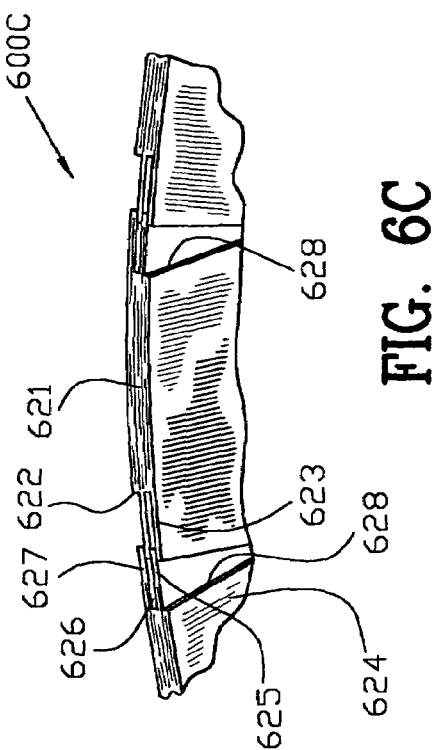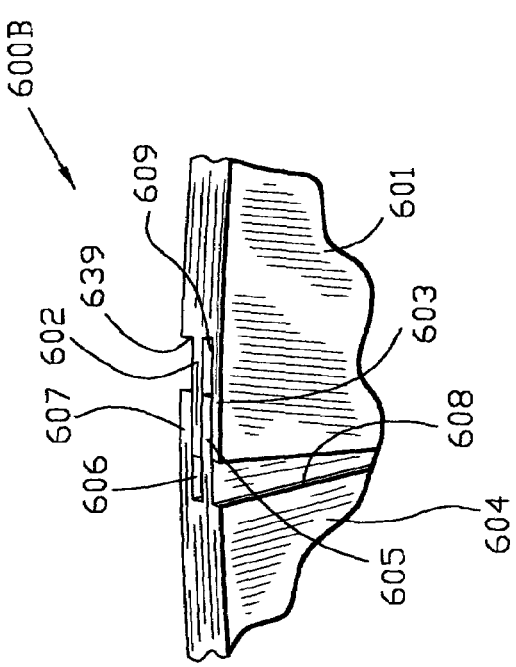

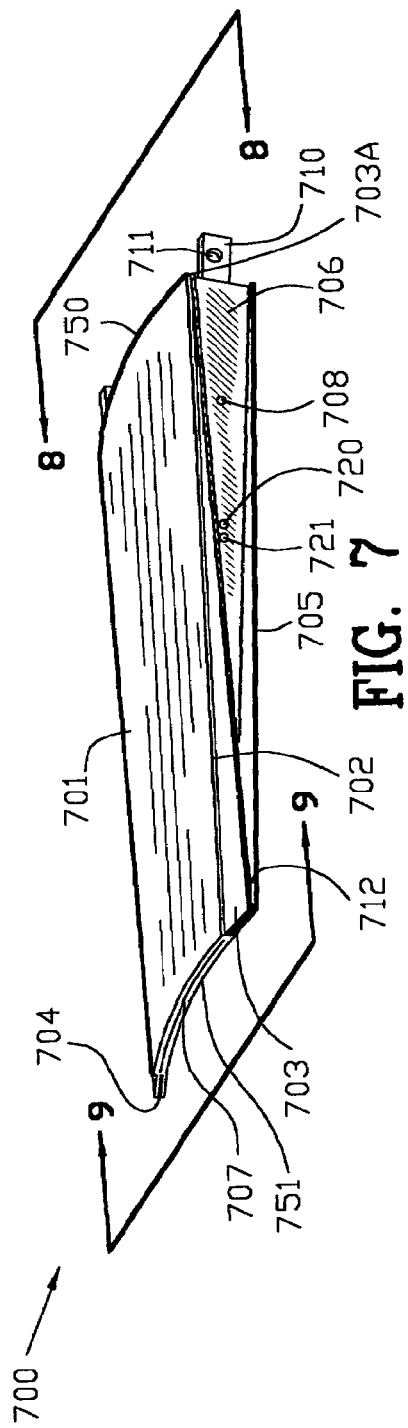

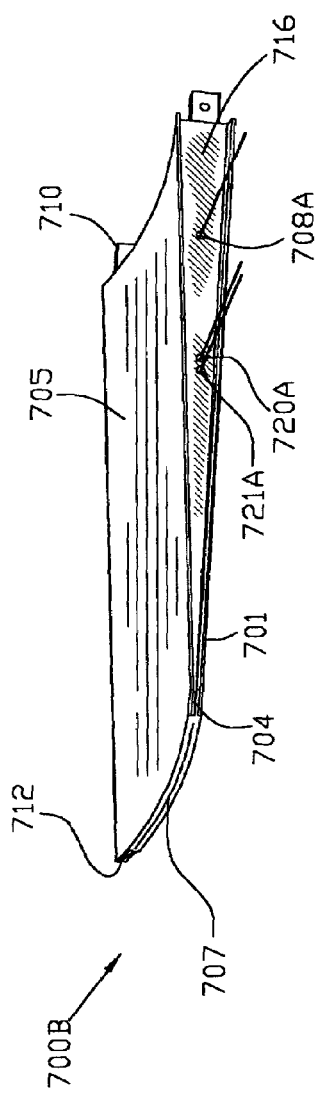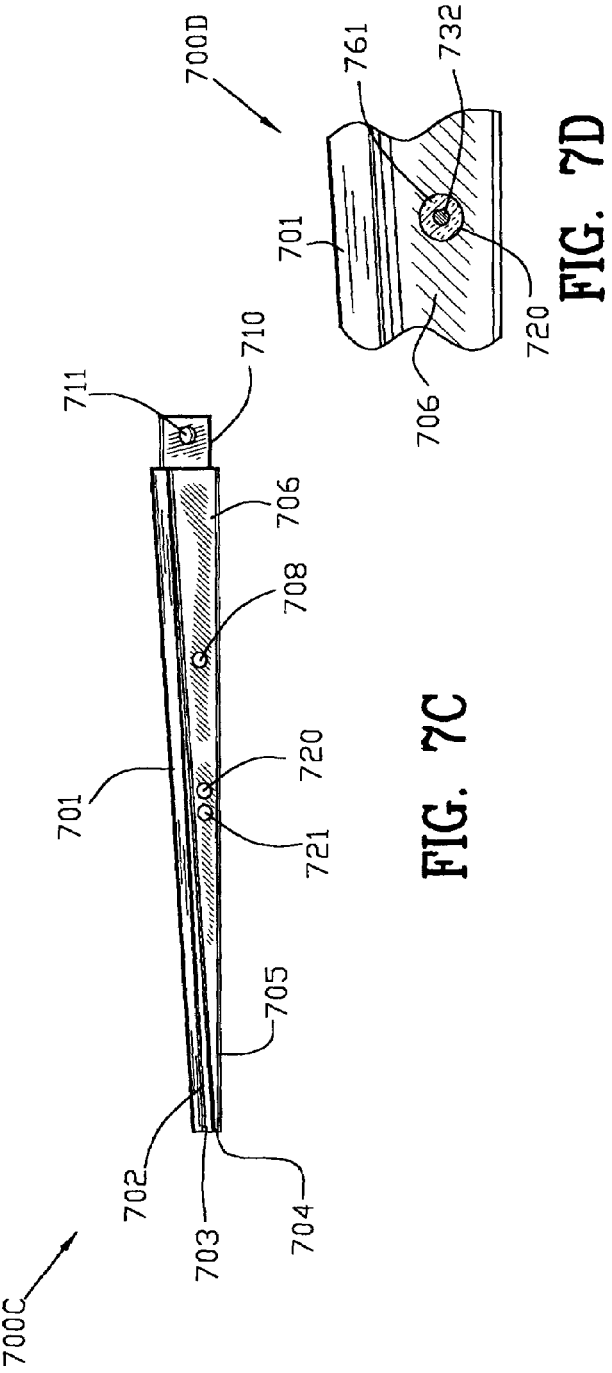
FIG. 7B
FIG. 7C
FIG. 7D

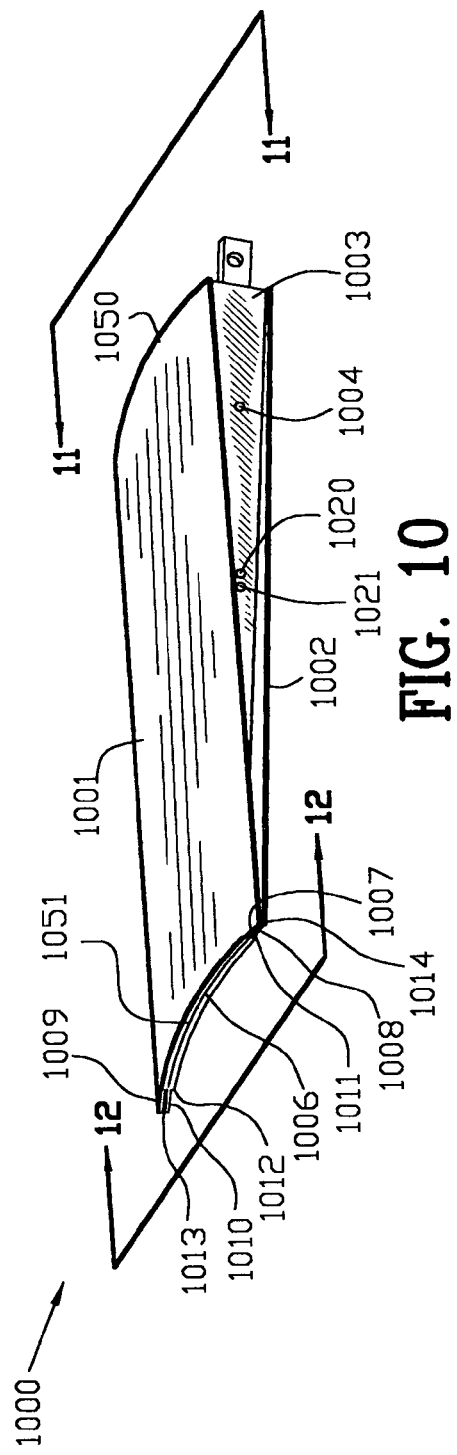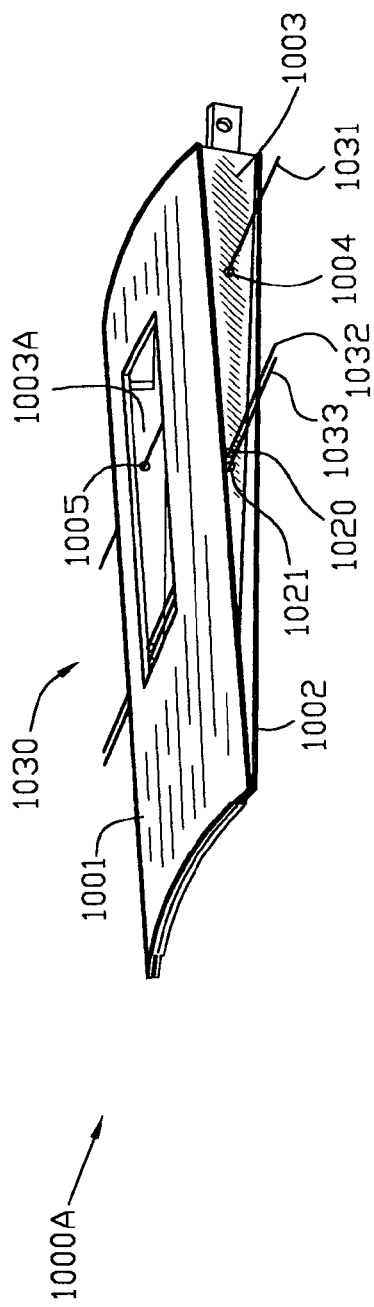
FIG. 10
FIG. 10A

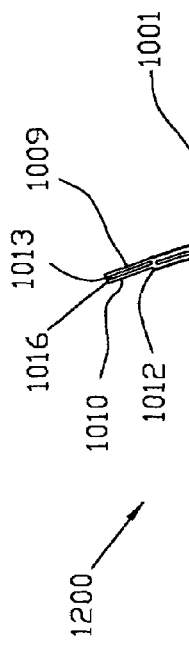
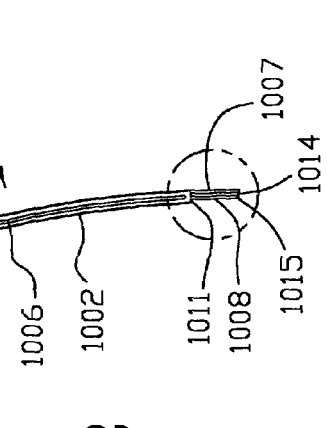
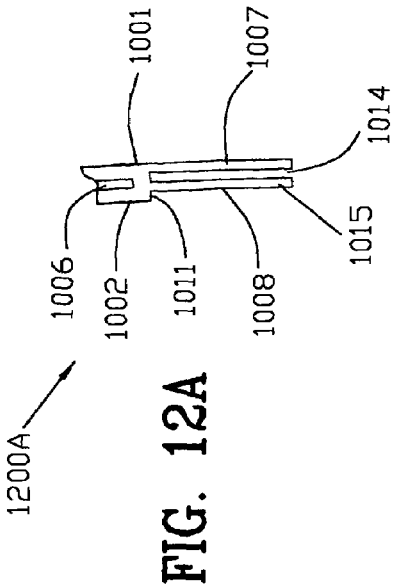
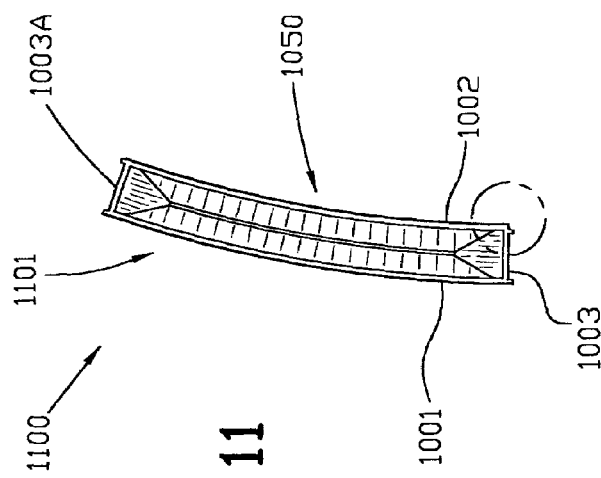
FIG. 12
FIG. 12A
FIG. 11
FIG. 11A

VARIABLE AREA NOZZLE INCLUDING A PLURALITY OF CONVEXLY VANES WITH A CROWNED CONTOUR, IN A VANE TO VANE SEALING ARRANGEMENT AND WITH NONUNIFORM LENGTHS

ORIGIN OF THE INVENTION

The invention described herein was made by employees of the United States Government, and may be manufactured and used by the government for government purposes without the payment of any royalties therein and therefor.

FIELD OF THE INVENTION

The field of the invention is variable area nozzles for use in connection with gas turbine engines. However, the invention may be used on other applications where dynamic flow control is needed, for example, hydraulic applications.

Background of the Invention

U.S. Pat. No. 6,318,070 B1 issued Nov. 20, 2001 to Rey et al. entitled Variable Area Nozzle For Gas Turbine Engines Driven By Shape Memory Actuators discloses a variable area nozzle having a plurality of flaps actuated by shape memory alloy (SMA) actuators to vary fan exit nozzle area. See, FIGS. 1 and 2. The plurality of flaps are sealed therebetween by a seal (not illustrated) to minimize air leakage. See, col. 6, lns. 53-55 of the '070 patent to Rey et al. As the flaps of the '070 patent are moved from the cruise position (i.e., nozzle has the minimum cross-sectional area) to the landing position (i.e., nozzle has the maximum cross-sectional area) the opening between the flaps increases and sealing becomes a more difficult problem as the gap between the flaps increases.

The '070 patent to Rey et al. includes a good discussion of conventional gas turbine engines. Referring to FIG. 3, conventional gas turbine engines include a fan section and core section (core engine). The core engines provide the primary thrust of turbojet engines whereas the bypass provides the primary thrust in turbofan engines. Still referring to FIG. 3, reference numeral 302 represents flow of air through the fan section and reference numeral 303 represents flow of combustion products through the core engine. The fans section and the core engine are disposed sequentially about a longitudinal axis and are enclosed in a nacelle. An annular path of air passes through the fan section of the gas turbine engine and exits through the fan nozzle formed by the nacelle and the core engine. Fan nozzles of conventional gas turbine engines have fixed geometry. The '070 patent to Rey et al. addresses a modification to the fixed geometry.

Requirements for take-off and landing conditions are different from requirements for the cruise condition. It is desirable to have a smaller diameter fan nozzle for increasing cruise efficiency and performance. Take-off and landing conditions require a larger diameter fan nozzle. Fixed geometry nozzles represent compromises between the requirements for take-off and landing in an attempt to satisfy both conditions.

Referring to FIG. 1, a partial cross-sectional cut away view 100 of the Rey et al '070 patent gas turbine engine 10 taken from the '070 patent FIG. 1 is illustrated. Fan section 12 and core engine 14 are illustrated as being disposed sequentially along a longitudinal axis 16. Reference numeral 18 indicates the outer housing of the gas turbine which is known as the nacelle 18. Primary air flow 20 passes through the core section and generates primary thrust 22. Fan exit nozzle 36 is illustrated as being a variable area nozzle 30 located in a downstream portion of the nacelle. A plurality of flaps 38 are illustrated. An annular path of fan flow 24, disposed radially outward of the path of the primary air flow 20, bypasses the core engine 14 and flows through the fan section 12, generating fan thrust 26. See, the '070 patent, col. 3 lns. 20 et seq.

Referring to FIG. 2, a partial cross-sectional view 200 taken from the prior art '070 patent to Rey et al., "each actuating mechanism 40 includes a four bar linkage [ ] comprising a drive or output arm 54 pivotally connected by means of pivots 56, 58 to the flap actuating portion 48 and to a link 60, respectively. The four bar linkage [ ] also includes a fixed member 62 that extends from the nacelle 18. The flap actuating portion 48 and the link 60 are pivotally attached to the fixed member 62 by means of pivots 64, 66, respectively. Pivot 64 functions as a hinge for the flap 38. The actuating mechanism 40 also includes a SMA actuator 68 engaging the drive arm 54 of the four bar linkage [ ]. In the preferred embodiment of the [ ] [Rey et al '070 patent] the SMA actuator 68 comprises a plurality of strands [ ] forming an array [ ]." See, col. 3 lns. 49 et seq.

Still referring to FIG. 2, "each return mechanism 42, according to one embodiment of the present invention, comprises a spring 84 disposed about a shaft 86 which is anchored to the spring 84 disposed about a shaft 86 which is anchored to the spring 84 disposed about a shaft 86 which is anchored to the nacelle 18 on one end thereof and pivotally attaching to a first bracket 88 on the other end thereof by means of a pivot 90. The first bracket 88 is pivotally affixed to the nacelle 18 and to a second bracket 92 by means of pivots 94, 96, respectively. The flap actuating arm 48 is also pivotally attached to the second bracket 92 by means of a pivot 98." See, col. 4, lns. 21 et seq.

In the Rey et al. '070 patent, the variable area nozzle uses a mechanical device with a locking pin which may be prone to binding to hold the rotating vanes in position. This design places a pair of SMA wire ropes (one used for opening and the other for closing) at the hinge point which translates into more SMA wire rope needed to overcome the hinge moment and thus added weight. Finally, the vanes are not self sealing but use an elastomeric seal between the vanes. At wide degrees of opening sealing is more difficult.

FIG. 3 is a prior art representation 300 of a gas turbine engine. Nacelle 301 is illustrated and fixed bypass nozzle area 302 is illustrated. Reference numeral 303 represents hot core engine gases exiting the core engine nozzle.

United States Patent Application Publication No. US 2002/0125340 A, inventors Birch et al., discloses a gas turbine engine exhaust nozzle having tabs extendable between a first deployed position and a second non-deployed position. United States Patent Application Publication No. US 2002/0125340 A at page 1 thereof discusses many exhaust noise problems associated with jet engine operation.

UK Patent Application GB 2355766, inventors Strange et al., applicant Rolls-Royce plc, discloses angle tabs having V-shaped nozzles therebetween.

There is a need for a lighter weight, self sealing variable area nozzle for use in connection with aircraft. Further, there is a need for fail safe operation such that the variable area nozzle fails in the open (largest area diameter) position. Finally, there is a need for a variable area nozzle whose concentricity is mechanically controlled and whose position is reliably controlled and/or reliably locked.

Further, there is a need for a variable area nozzle having a minimum number of vanes. Further is a need for a variable area nozzle closer which maximizes the counter hinge moment.

A better understanding of the invention will be had when reference is made to the SUMMARY OF THE INVENTION, BRIEF DESCRIPTION OF THE DRAWINGS, DESCRIPTION OF THE INVENTION and CLAIMS which follow hereinbelow.

SUMMARY OF THE INVENTION

The present invention is a variable area nozzle which utilizes vanes which are self sealing. The present variable area nozzle includes (1) rigid, self sealing interengaging vanes which form the nozzle; (2) magneto-rheological dampers, brakes and holding devices for positioning the nozzle; (3) closers including SMA wire actuation closers; and, (4) openers including fail-safe opening devices.

Vanes

A plurality of 18 vanes are rotatably and circumferentially mounted on a concentric support which may be mounted on a nacelle of a gas turbine engine or some other device. It will readily be recognized by those having skill in the art that a different number of vanes may be used without departing from the spirit and the scope of the claims which are set forth below. The invention as disclosed herein may employ fewer or more vanes as the situation requires.

Vanes composed of lightweight material for example Aluminum, DRA (Discontinuous Reinforced Aluminum), PMC (Polymeric Matrix Composite), MMC (Metal Matrix Composite), and CMC (Ceramic Matrix Composite) vanes may be used in gas turbine engine applications. Other flow control applications may use substantially different material. Although this invention is primarily directed toward use in connection with gas turbine engines, the principles taught herein are equally applicable to several and varied engineering disciplines.

Each vane interengages its neighboring vane in its range of motion which varies between a first position corresponding to a nozzle having a minimum cross-sectional area to a second position corresponding to a nozzle having a maximum cross-sectional area. The vanes have interior and exterior surfaces with interior surfaces defined as those facing the interior of the gas turbine engine within which they are mounted. Exterior surfaces are those facing outwardly from the gas turbine engine. Each surface of the vane includes a convex contour which contributes to the concentricity of the vanes and hence the nozzle over its full range of opening and closing. Convex is determined from the orientation outside (to the exterior of) the variable area nozzle. Each vane includes two tongues and two grooves which coact with reciprocal tongues and grooves of the adjacent vanes. Male vanes include a uniform interior surface (i.e., a surface without grooves) and female vanes include a uniform exterior surface (i.e., a surface without grooves). Male vanes each include an exterior surface which has two grooves and female vanes each include an interior surface which has two grooves. All of the grooves are generally arranged as non parallel legs of a trapezoid.

Those skilled in the art will readily recognize that various types and geometries of tongue and groove interengaging vanes may be used without departing from the spirit and scope of the invention.

Each vane is supported by a tapered stiffener and includes a leading edge and a trailing edge. All of the tapered stiffeners are generally arranged as non parallel legs of a trapezoid. The leading edge of the vane is thicker than the trailing edge of the vane. Interior and exterior surfaces of the vanes are affixed to the tapered stiffeners within the vanes. Alternatively, the vanes including the tapered stiffeners may be cast using the lost wax investment casting process or some other casting process. There are preferably two to four tapered stiffeners within the vanes although different numbers of tapered stiffeners may be used.

Closers

Fluid flow though a nozzle converts the energy of the fluid to kinetic energy. Pressure is exerted outwardly on the nozzle and the closer must counteract this pressure. Since the vanes of the nozzle are rotatably mounted to a support mounted to the gas turbine engine, a moment is created by the pressure applied to the vanes. The closer counteracts this moment and is responsible for narrowing the variable area nozzle. Many different materials may be used as the closer. Preferably the closer is an SMA (shape memory alloy) rope which is laced through apertures in the individual vanes which comprise the nozzle. Apertures are radially spaced in the tapered stiffeners of the vanes to enable counteraction of the moment created by the opening forces. The opening forces include the wind or outward pressure on the nozzle coupled with the force of the spring or other opener (discussed hereinbelow).

The SMA (shape memory alloy) may be a wire, a plurality of wires, or a rope which extends through each and every one of the vanes circumferentially mounted on the support. Electrically nonconductive standoffs or insulators are used to secure the SMA (shape memory alloy) inside the vanes. A plurality of 18 vanes extend 360 degrees around the circumference of a support which is concentric with a nacelle of a gas turbine engine.

Alternatively, the support may itself be pivotably attached to the nacelle enabling vectoring of the engine thrust. This alternative may also be effected in the application of the invention to the core engine.

Optionally, vanes adapted for cooling may be used on the engine core. Optionally, vanes having extenders to change the length of the vanes may be employed. Optionally, vanes having different lengths may be employed.

The SMA wires or ropes extend 360 degrees within the vanes and function to close the nozzle when the SMA wires or ropes are heated. Heating of the SMA material is accomplished by applying a voltage (DC or AC) to it causing it to contract. Other means of heating the SMA material may be used. Although SMA wire ropes are the preferred material for the closer, other materials such as an ordinary metallic, polymeric, or synthetic wire or plastic rope may be used.

Optionally, a hydraulically based or a mechanically based device may close the vanes of the nozzle. Such a device is not necessary on every vane as the contoured vanes each include tongues and grooves on respective vanes which urge adjacent vanes closed. Thus uniform and concentric closing occurs.

Openers

An opener, a leaf or coil spring, is employed between the tapered stiffeners of the individual vanes to assure fail-safe opening. Opener must be able to open in a dynamic or static situation. One portion of a leaf spring may be welded or otherwise secured to the outer portion of a stiffener of a vane and the other portion of the spring acts against the outer portion of the stiffener of the adjacent vane. Another embodiment includes a coil spring secured to the outer portions of stiffeners of adjacent vanes. Selection, sizing and placement of the spring are dependent upon the particular application of the variable area nozzle.

Springs are fail-safe openers which position the nozzle in the maximum open position. Springs may be employed between all vane to vane interfaces or they may be employed periodically around the circumference of the nozzle. Since the entire nozzle is comprised of interengaging contoured vanes each having tongues and grooves, the spring force between two vanes has the tendency to open vanes adjacent to those two vanes. Thus with sufficient sizing and placement of the springs, uniform concentric opening of the nozzle occurs.

Another embodiment of the invention includes the use of hydraulic actuators for opening the vanes.

Brakes and Dampers

A magneto-rheological brake/device acting primarily in compression is preferably mounted about the pivot axis of one or more of the vanes of the nozzle. The magneto-Theological device further acts as a damper as the viscosity of the fluid is varied as the magnetic field about the brake is increased or decreased. The magneto-rheological brake/device further acts as a locking device to maintain the vanes in the desired position such as at cruise altitude or in a cruise condition.

It is an object of the present invention to provide a concentric self sealing variable area nozzle.

It is an object of the present invention to provide self-sealing interengaging vanes which form the variable area nozzle.

It is a further object of the present invention to provide a variable area nozzle which includes a magneto-rheological damping, brake and/or holding device for position control of the nozzle.

It is a further object of the present invention to provide a closer for varying the position of the nozzle against the force of an opening device and/or internal fluid pressure. It is a further object of the present invention to preferably provide a SMA (shape memory alloy) closer comprised of wires or ropes for weight advantage.

It is a further object of the present invention to provide a fail safe opener.

It is a further object to provide a process for controlling the positioning of the variable area nozzle.

It is a further object of the present invention to provide a smart, self-sealing variable area nozzle.

It is a further object of the present invention to provide a variable cross-section area nozzle which allows dramatic dynamic flow changes.

It is a further object of the present invention to reduce gas turbine engine noise and increase gas engine turbine thrust.

It is an object of the present invention to protect the actuating system (i.e, SMA wires) from external damage.

It is a further object of the present invention to enable placement of the SMA actuator (closer) at a position that maximizes the hinge moment thus minimizing the required actuation force (i.e., the number of SMA wires within the rope/bundle) thereby decreasing weight while still maintaining a specified life requirement.

It is a further object of the present invention to provide a variable area nozzle which is concentric with each vane opening and closing in unison with the other vanes.

It is a further object of the invention to provide a smart material torsional or axial magneto-rheological braking system that can be either a fail-safe or non-fail safe braking system. The torsional brake is described in our copending patent application filed simultaneously with this patent application. The purpose of the magneto-rheological braking system is to enable position control and nozzle opening speed by using the variable viscosity magneto-rheological fluid within the braking system.

These and other objects will be best understood when reference is made to the BRIEF DESCRIPTION OF THE DRAWINGS, DESCRIPTION OF THE INVENTION, AND CLAIMS which follow hereinbelow.

BRIEF DESCRIPTION OF THE DRAWINGS

FIG. 3 is a prior art representation of a gas turbine engine.

FIG. 4 is a schematic representation of a nacelle of a gas turbine engine and a schematic representation of the present invention mounted to the nacelle. FIG. 4 illustrates the vanes in first position of minimum cross-sectional area.

FIG. 4A is an end view of FIG. 4 taken along the lines 4A-4A.

FIG. 4C is a schematic of a second embodiment of the present invention mounted to a nacelle.

FIG. 4D is a schematic of the second embodiment of the present invention mounted to a nacelle taken along the lines 4D-4D of FIG. 4C.

FIG. 5 is a schematic representation of a nacelle of a gas turbine engine and a schematic representation of the present invention mounted to the nacelle. FIG. 5 illustrates the vanes in the second position of maximum cross-sectional area.

FIG. 5A is an end view taken along the lines 5A-5A of FIG. 5.

FIG. 5B is an illustration of the exterior of two adjacent vanes in the fully closed position, namely, when the nozzle has minimum cross sectional area.

FIG. 5C is a perspective view of a leaf spring.

FIG. 6A is an enlargement of a portion of FIG. 6 illustrating the vanes in a relatively open position.

FIG. 6B is an enlargement of a portion of FIG. 6 illustrating the vanes in a relatively closed position.

FIG. 6C is an illustration of asymmetric sealed vanes.

FIG. 7 is a perspective view of the exterior side of the male vane.

FIG. 7A is a perspective view of the exterior side of the male vane similar to that illustrated in FIG. 7 with an optional access window.

FIG. 7B is a perspective view of the interior side of the male vane.

FIG. 7C is a side view of the male vane illustrated in FIG. 7.

FIG. 7D is a schematic illustration of an insulated conductor (i.e., an SMA wire).

FIG. 8A is an enlargement of a portion of FIG. 8.

FIG. 9A is an enlargement of a portion of FIG. 9.

FIG. 10 is a perspective view of the exterior of a female vane.

FIG. 10A is a perspective view of the exterior of a female vane similar to that illustrated in FIG. 10 with an optional access window.

FIG. 11 is a view of the leading edge of the female vane taken along the lines 11-11 of FIG. 10 illustrating the inner or inside portion of the female vane.

FIG. 11A is an enlargement of a portion of FIG. 11.

FIG. 12 is a view of the trailing edge of the female vane taken along the lines 12-12 of FIG. 10.

FIG. 12A is an enlargement of a portion of FIG. 12.

Figure 1:
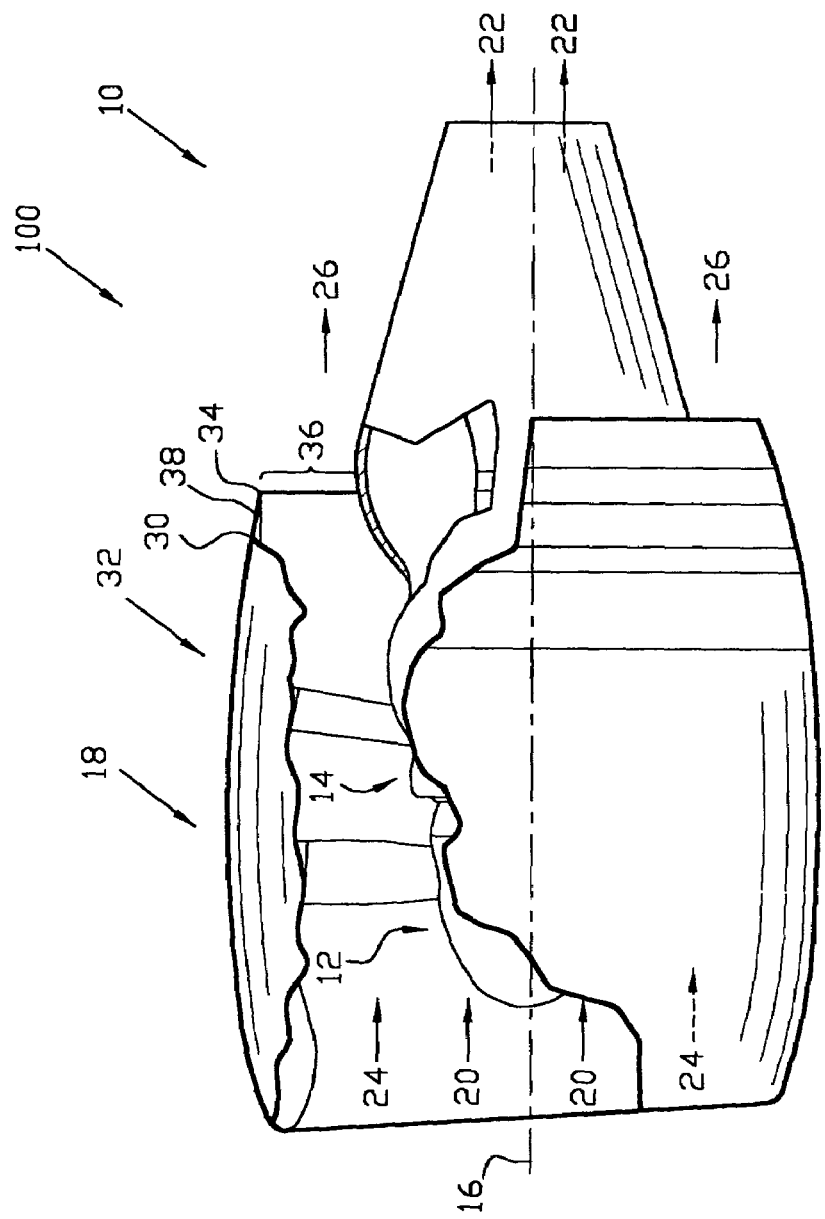
FIG. 1 is a prior art illustration taken from the '070 patent to Rey et al. of a gas turbine engine.
Figure 2:
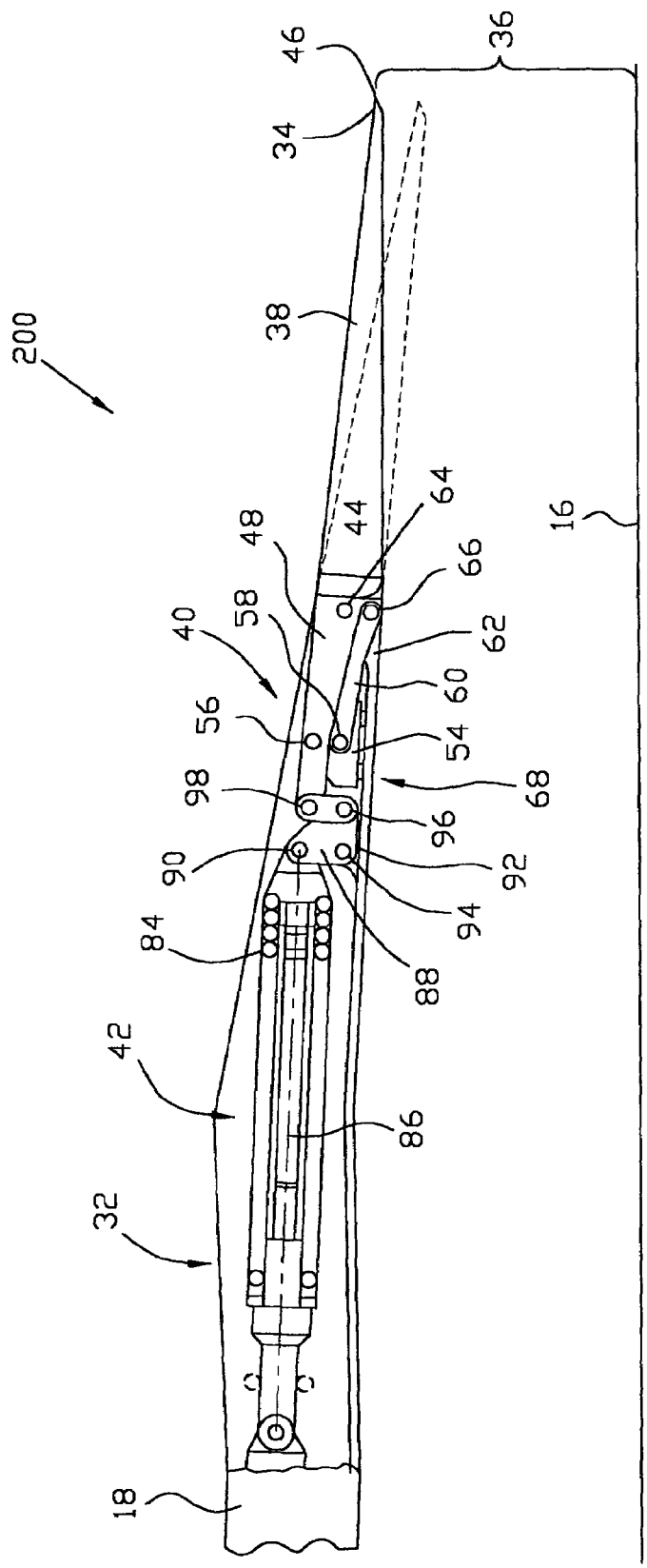
FIG. 2 is a prior art illustration taken from the '070 patent to Rey et al. of a flap on the nacelle of a gas turbine engine.

A better understanding of the invention will be had when reference is made to the following DESCRIPTION OF THE INVENTION and CLAIMS.

DESCRIPTION OF THE INVENTION

FIG. 4 is a schematic representation 400 of a nacelle 405 of a gas turbine engine and a schematic representation of the present invention mounted to the nacelle 405. FIG. 4 illustrates vanes 401, 402, 403 and 406 in first position of minimum cross-sectional area D1. Support 404 is affixed to the nacelle 405. Optionally, support 404 may pivot to enable vectoring of the thrust of the engine. Vanes 401 etc. are rotatably mounted to support 404. FIG. 4A is an end view 400A of FIG. 4 taken along the lines 4A-4A of FIG. 4 illustrating, among other things, the interior 407 of the nozzle. In FIGS. 4 and 4A, the tongues and grooves of each vane are fully engaged with the respective tongues and grooves of the adjacent vanes.

Figure 4B:
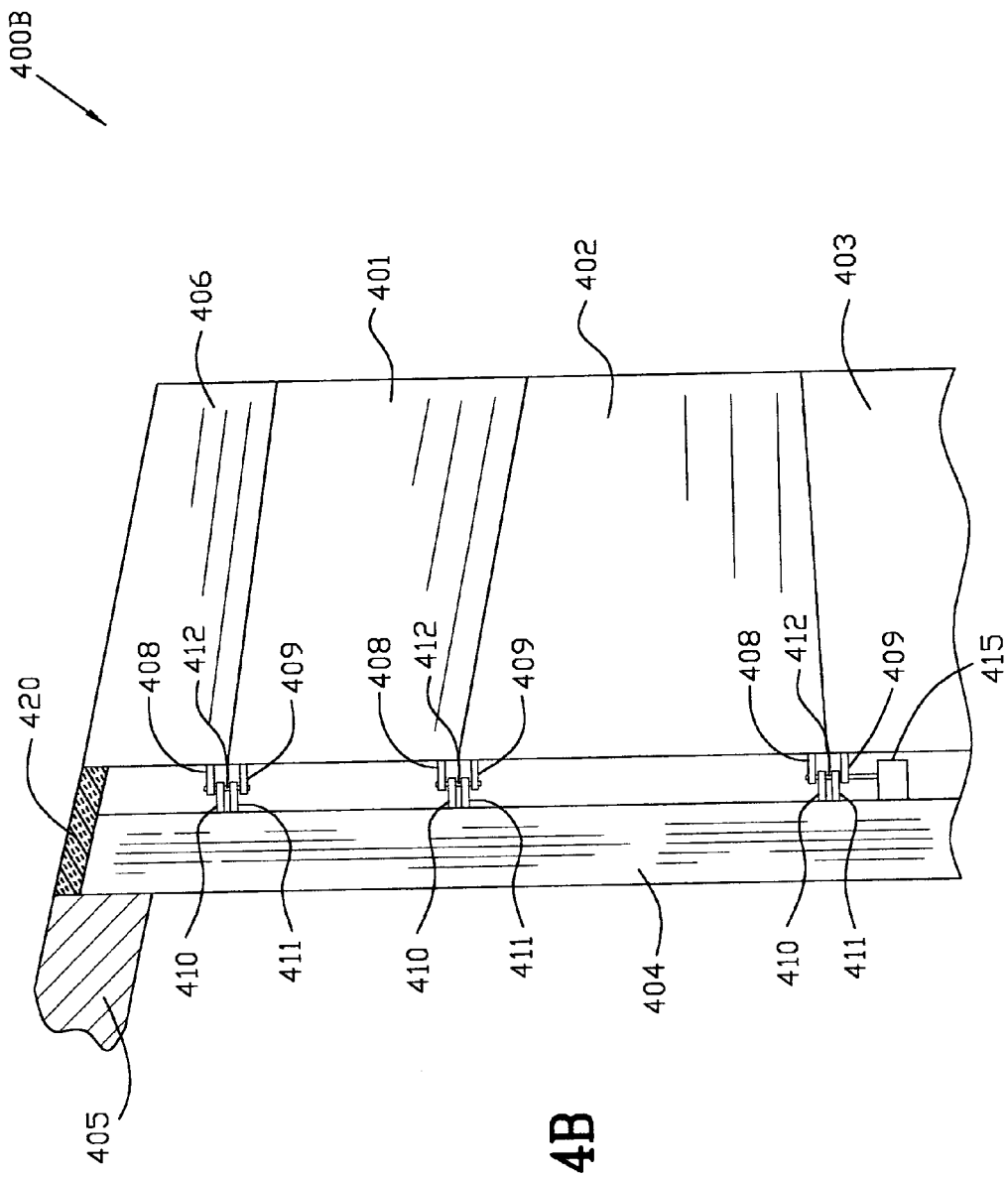
FIG. 4B is an enlarged schematic of one embodiment of the present invention mounted to a nacelle.

FIG. 4B is an enlarged schematic 400B of one embodiment of the present invention mounted to a nacelle 405 by support 404. Seal 420 is diagrammatically illustrated in FIG. 4B for sealing the interengaging vanes 401, 402, 403 and 406. Hinge pairs 408 and 409 on the vanes coact with hinge pairs 410 and 411 on support 404. Shafts 412 are fixed to hinges 408 and 409 on the vanes. Torsional magneto-rheological brake 415 operates on one of the shafts 412. Preferably there are 6 magneto-rheological brakes 415 equally spaced around the 360 degree circumference of the support 404. However, depending upon the application there may be fewer or more brakes.

FIG. 4C is a schematic 400C of a second embodiment of the present invention mounted to a support 404A which in turn is affixed to a nacelle 405A. FIG. 4D is a schematic 400D of the second embodiment of the present invention mounted to a support 404A which in turn is affixed to a nacelle 405A taken along the lines 4D-4D of FIG. 4C. A magneto-rheological brake 425 of the type disclosed in our copending application filed simultaneously with this application operates on shaft 443 which is secured to adapters 442 and 444 by set screws 422. Adapters 442 and 444 pass through hinges 441 and 445 affixed to support 404A and are rotatable with respect to said hinges 441 and 445. Shaft 443, which may be splined, could alternatively be directly connected to hinges 440, 440A.

Adapter 444 may be connected to another shaft or another adapter 450 as set forth in FIG. 4D by union 446. Also illustrated in FIG. 4D are hinges 448 and 449. Referring still to FIGS. 4C and 4D, reference numeral 430 schematically illustrates vane 430 and elastomeric seals 420A, 460 which prevent the escape of fluid (i.e. air, hot gases etc.) upon rotation of the vane 430. Exterior portion 430A and interior portion 430B of vane 430 are illustrated in FIGS. 4C and 4D. In FIG. 4D the curvature of the vane 430 is illustrated in phantom.

Figure 4E:
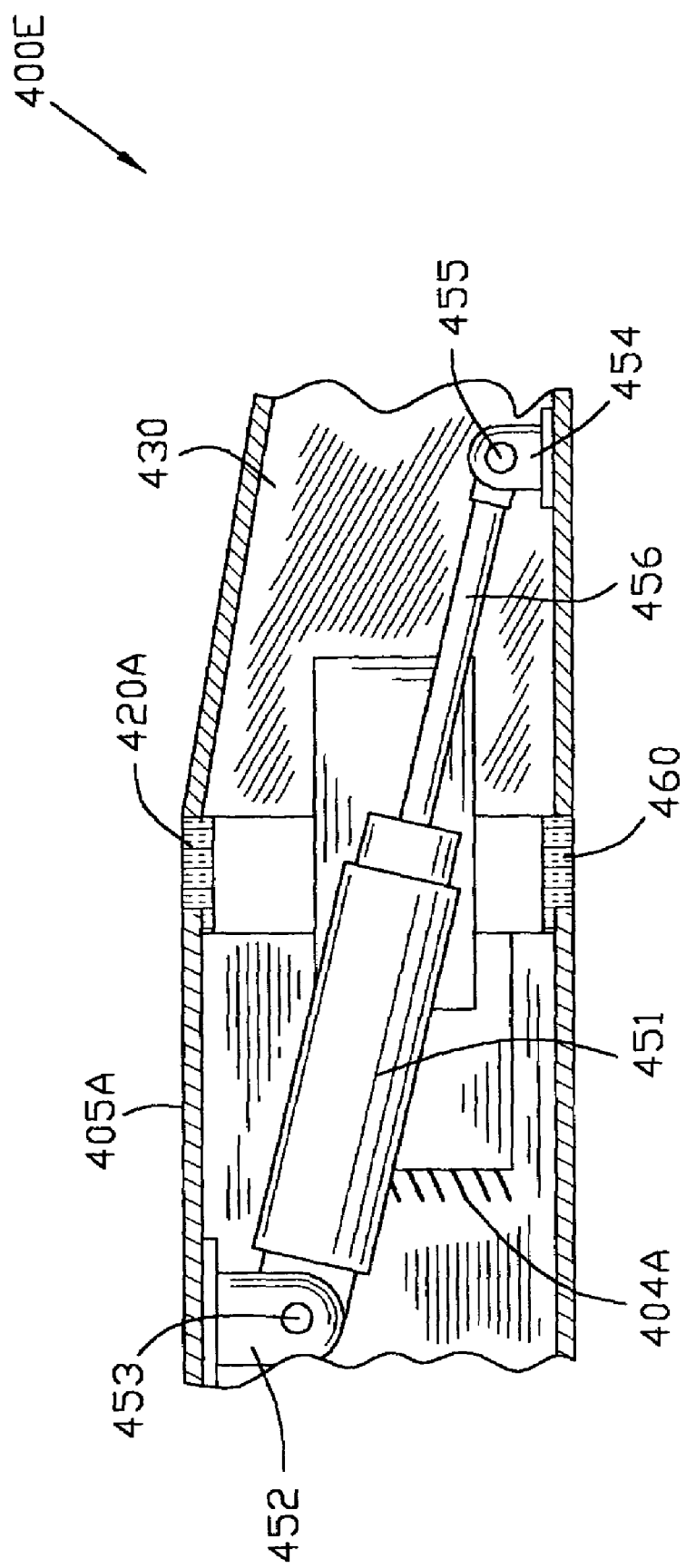
FIG. 4E is a schematic of a third embodiment of the present invention mounted to a nacelle.

FIG. 4E is a schematic 400E of a third embodiment of a vane 430 of the present invention mounted to a nacelle 405A through support 404A. Actuator 451 may be a linear magneto-rheological brake or it may be a hydraulic actuator. In the embodiment of FIG. 4E, a pivot 454 is affixed to the vane 430 and another pivot 452 is affixed to the nacelle 405A. Actuator 451 includes corresponding pivot 455 for coaction with pivot 454 and corresponding pivot 453 for coaction with pivot 452. Arm 456 variably extends to deploy the infinitely positionable variable area nozzle to the desired position between minimum cross-sectional area and maximum cross sectional area.

Figure 4F:
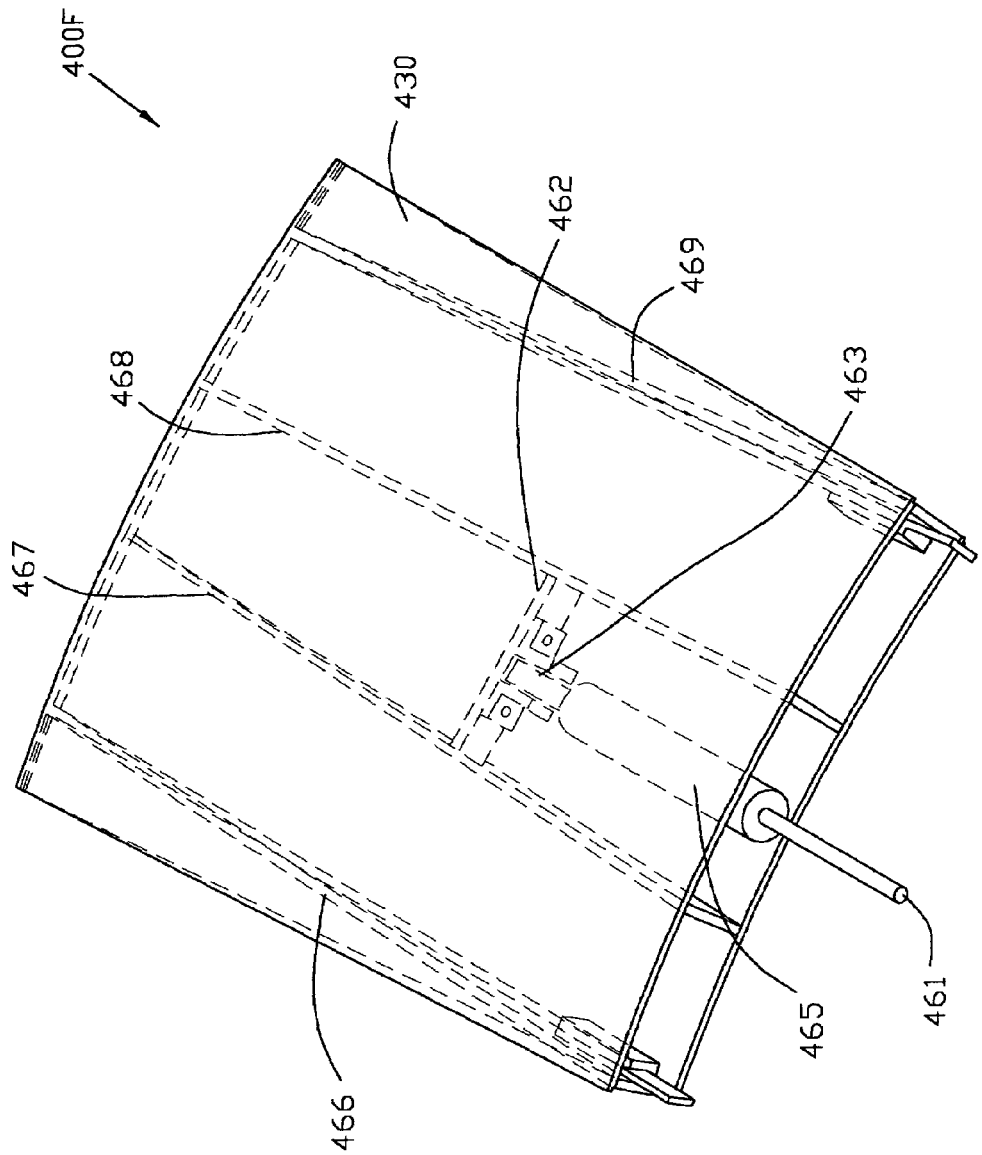
FIG. 4F is a schematic of a fourth embodiment of the present invention illustrating a piston actuator in combination with a vane having 4 tapered stiffeners.

FIG. 4F is a schematic 400F of a fourth embodiment of the present invention illustrating a piston actuator 465 in combination with a vane 430 having 4 tapered stiffeners, 466, 467, 468, and 469. The stiffeners 467, 468 are parallel with respect to each other while stiffeners 466, 469 are oriented as non parallel legs of a trapezoid. Positioned within vane 430 is a support 462 which includes a pivot 463 connected to piston 465. Piston 465 may be a hydraulically actuated piston or it may be a axial magneto-rheological device. Piston 465 includes a moveable and pivotable rod 461 as described in connection with FIG. 4E.

FIG. 5 is a schematic representation 500 of a nacelle 405 of a gas turbine engine and a schematic representation of the variable area nozzle of the instant invention mounted to the nacelle 405. FIG. 5 illustrates the vanes 401, 402, 403 etc. in the second position of maximum cross-sectional area D2. In this position, the gas turbine engine is not operating as efficiently as possible but noise is reduced by enlarging the cross-section of the bypassed flow, that is the flow through the bypass nozzle area. Reference numerals 561, 562 illustrate the interengagement sealing of vanes 402 and 403 viewed from outside the nozzle. Although the nozzle is illustrated in its fully open position of maximum cross sectional area D2, it is completely sealed. In fact, it is self sealing as will described in greater detail hereinbelow. Referring to FIG. 5A, similarly, reference numerals 563 and 564 illustrate the interengagement of vanes 402 and 403 viewed from inside the nozzle.

FIG. 5A is an end view 500A taken along the lines 5A-5A of FIG. 5. D2 as illustrated in FIG. 5A is larger than D1 as illustrated in FIG. 4A.

FIG. 5B is an illustration 500B of the exterior of two adjacent vanes 501, 502 in the fully closed position, namely, when the nozzle has minimum cross sectional area D1. In other words, FIG. 5B is an illustration of a portion of the nozzle as viewed from outside the nozzle. A leaf spring 504 is employed as an opener. FIG. 5C is a perspective view 500C of a leaf spring 504. Another leaf spring is illustrated affixed to stiffener 523 which operates between vane 502 and the adjacent vane which is not shown.

Vane 501 is a female vane and vane 502 is a male vane as defined by the extent of their interior surfaces as will be discussed below in connection with FIGS. 7 and 10. It will be noticed that the exterior of vane 501 is substantially trapezoidally shaped as indicated by lines 580, 580A. Vane 502 is substantially trapezoidally shaped as well as indicated by line 505. The left most extent of vane 502 resides near line 506 which indicates a stiffener in phantom. The left most extent of vane 502 is not illustrated in FIG. 5B so as to enhance the clarity of the illustration. All vanes employed are substantially trapezoidally shaped. Those skilled in the art will readily recognize that other vane profiles may be used other than a profile which is substantially trapezoidally shaped. For instance, vanes which are substantially rectangularly shaped may be employed.

Leaf spring 504 is affixed 503 to tapered stiffener 522 and includes an end portion which engages stiffener 521 which is illustrated in phantom. Springs between each and every vane are not necessary in all nozzle applications and as such they may be placed between every other vane or every third vane or spaced in some other fashion.

Reference numerals 580 and 580A define the extent of the exterior surface of female vane 501. Reference numerals 580A and 580B define the extent of the exterior surface of male vane 502.

Vane 501 includes support rails 520 and 521 which are tapered support rails or stiffeners arranged in the configuration of non parallel legs of a trapezoid. They are illustrated in FIG. 5B in phantom as they reside between the exterior and interior surfaces of the vane 501. Preferably vanes 501, 502 are made of Aluminum but they can be made of different materials.

Vane 502 includes support rails 522 and 523 which are tapered support rails or stiffeners arranged in the configuration of non parallel legs of a trapezoid. The exteriors and interiors of the vanes are permanently and non-movably affixed to the stiffeners. Reference numerals 505 and 506 indicate the extent of the interior surface of vane 502. The vanes 501 and 502 are interleaved, self-sealing tongue and groove vanes. One exterior groove 580B is illustrated in male vane 502.

Still referring to FIG. 5B, SMA rope or wire 525, 526, 527 can be placed radially as desired. Since vanes 501 and 502 are hollow, SMA wire is laced therethrough and can be positioned radially away from the pivot points. In this way, as the SMA wire or rope is heated, less force is required for the SMA wire to be placed through eyelets 530, 532, 534 and 535 to counteract a given moment created by pressure from within the nozzle. The SMA wire is insulated by nonconductive SMA standoffs placed in the eyelets. A DC voltage may be applied to the SMA as indicated by the symbols V+ and V− in FIG. 5B. Alternatively, AC voltage or some other energy source may be employed to heat and contract the SMA wire or SMA rope. To ensure uniform heating, a DC voltage is applied to the SMA wire which is laced through a plurality of vanes. It is also within the scope of the invention to employ an SMA closer through additional eyelets such as eyelets 529, 531, 533 and 536. If required, additional eyelets 528, 539, 540 and 541 may be laced with SMA wire radially closer to the pivot points.

Closers other than SMA wire or SMA rope may be employed. For example, a metallic or synthetic wire may be mounted in the eyelets and mechanically contracted. Alternatively, the magnetorheological device may be replaced by a pulley driven motor. In this way, the motor/pulley can open or close the vanes of the driving shaft 510 (for instance) directly.

Pivot pairs 508, 509 and 512, 513 are schematically illustrated for rotating vane 501 about shaft or axis 510. A magneto-rheological brake 511 is employed to brake, dampen and lock motion of the shaft 510. Similarly, pivot pairs 514, 515 and 517, 518 are diagrammatically illustrated for rotating vane 502 about shaft or axis. Each vane includes two pivots, however, one pivot or greater than two pivots may be used without departing from the spirit and scope of the invention as claimed below.

Figure 5D:
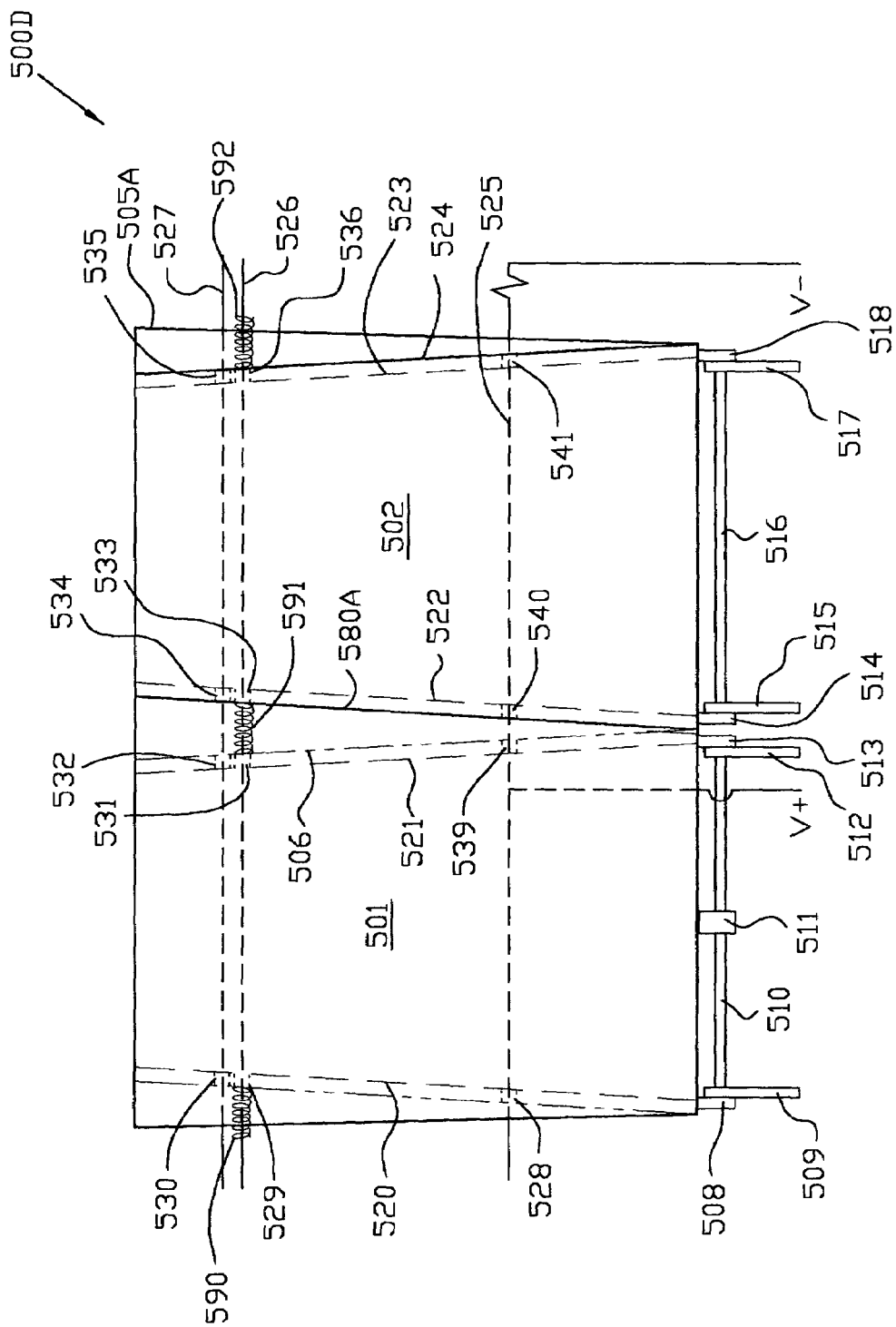
FIG. 5D is an illustration of two adjacent vanes similar to FIG. 5B employing a coil spring as the opener.

FIG. 5D is an illustration 500D of adjacent vanes 501, 502 similar to FIG. 5B employing coil springs 590, 591 and 592 as openers. The coil springs and leaf springs illustrated in FIGS. 5B and 5D may be placed between the stiffeners of adjacent vanes at any radial position.

Figure 5E:
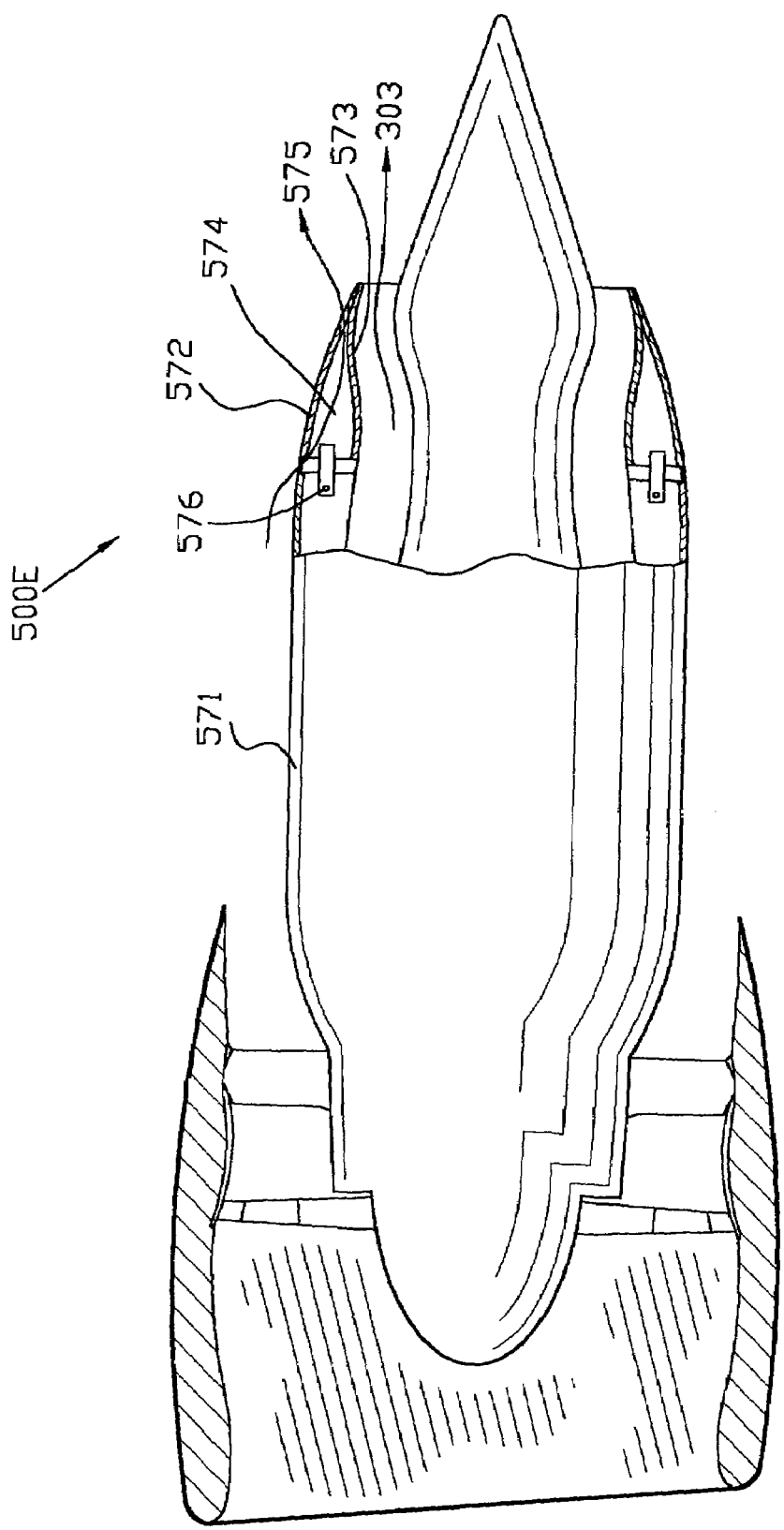
FIG. 5E is a schematic illustration of the invention used in the core exhaust stream.

FIG. 5E is a schematic illustration 500E of the variable area nozzle of the instant used on the core engine 571. Vanes 574 are rotatably mounted at pivot 576 to the core engine 571 and bypass air is routed through the vane as indicated by arrow 575. The inner surfaces 573 of the vane 572 may be constructed from a material having low thermal conductivity, i.e., a thermal insulator, so as to protect the vanes from destruction.

Springs are used as openers and fail safe devices. In the event of power failure to the SMA rope, springs push the interleaved vane apart opening the variable area nozzle to the second open position. Similarly, the magnetorheological device employed may be configured to be fail in its last position such that power is required to reposition the brake.

Figure 6:
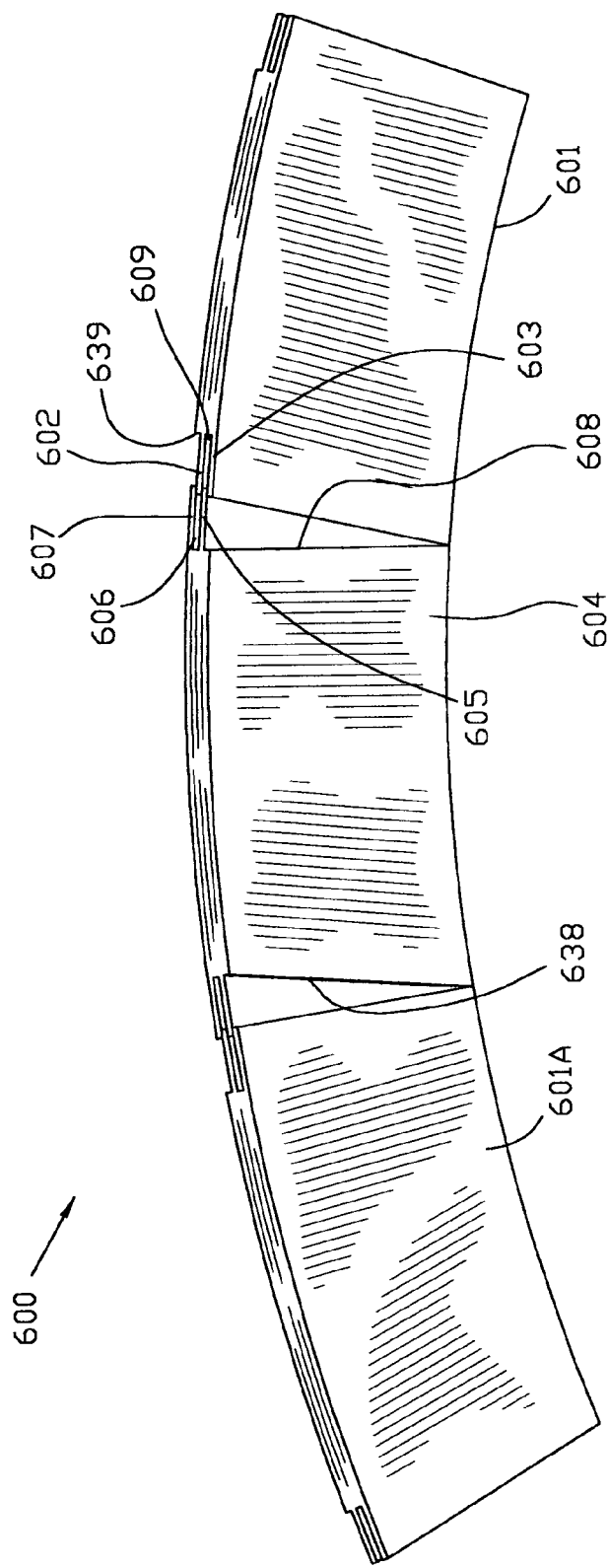
FIG. 6 is an illustration of three adjacent self-sealing vanes.

FIG. 6 is an illustration 600 of the interior side of three adjacent self-sealing vanes 601, 604 and 601A. Vanes 601 and 601A are male vanes and their interiors have no grooves. Vane 604 is female vane having grooves 608 and 638. FIG. 6 illustrates the vanes in their fully open position and self sealed. Referring to FIG. 6A, an enlargement 600A of a portion of FIG. 6 illustrating the vanes in the full open position, tongues 602 and 603 of male vane 601 slidingly and sealingly interengage grooves 606 and 608 of female vane 604. Similarly, tongues 605, 607 of female vane 604 slidingly and sealingly interengage grooves 609 and 639 of the male vane 601.

Still referring to FIGS. 6 and 6A, groove 606 of female vane 604 is formed by the exterior portion 607 and interior portion 605 of the female vane 604 and it extends downward and is oriented as a non parallel trapezoidal leg toward the leading edge of the female vane 604. Groove 608 is a shoulder which extends downward and is oriented as a non parallel trapezoidal leg toward the leading edge of the female vane 604. Similarly groove 609 is formed in male vane 601 by interior portion 603 and exterior portion 602. Groove 639 or shoulder 639 on the exterior of the male vane 601 is similar to groove 606 of the female vane 604. Grooves 609 and 639 extend downwardly toward the leading edge of the male vane 601 and are oriented as non parallel trapezoidal legs. FIG. 6B is an enlargement 600B of a portion of FIG. 6 illustrating the vanes in a relatively closed position. FIGS. 6-6B illustrate the interengagement of the respective tongues and grooves of the male and female vanes.

FIG. 6C is an illustration 600C of asymmetric sealed vanes 621, 624. In other words, the vanes employed in FIG. 6C, for example, have only one groove 628 in its interior and one groove 622 in its exterior. Vane 624 includes tongues 625, 627 and grooves 626 and 628.

Figure 6D:
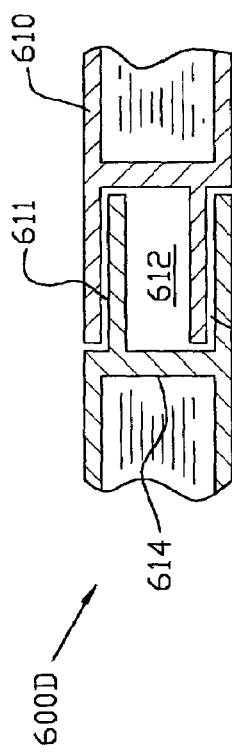
FIG. 6D illustrates a metal to metal seal arrangement.
Figure 6E:
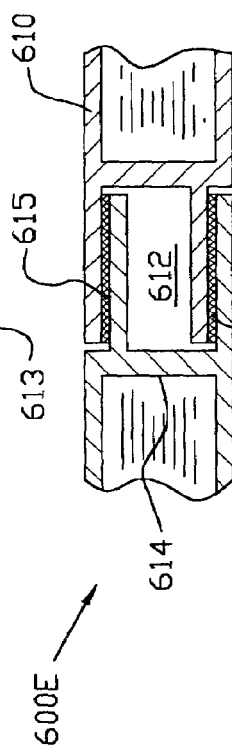
FIG. 6E illustrates a supplemental brush seal arrangement.
Figure 6F:
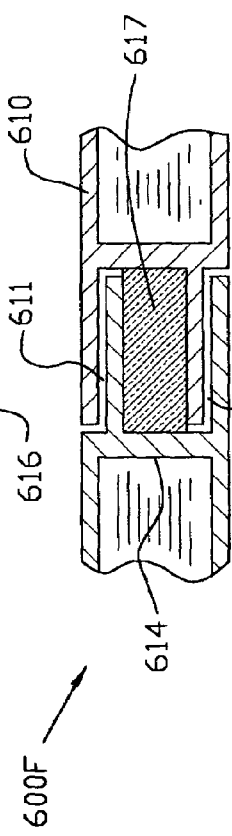
FIG. 6F illustrates a supplemental hydrostatic seal arrangement.

FIG. 6D is an illustration 600D of a metal to metal seal arrangement between two vanes 610, 614. Gaps 611, 613 as well as an interior space 612 are a labyrinth which seals the vanes. When the vanes are pressurized, the tongues of one vane will engage the grooves of the adjacent vanes. FIG. 6E is an illustration 600E of supplemental brush seals 615 and 616 residing in spaces between the tongues and their respective grooves. FIG. 6F is an illustration 600F of a supplemental hydrostatic seal 617 residing in the interior space between the vanes.

Figure 6G:
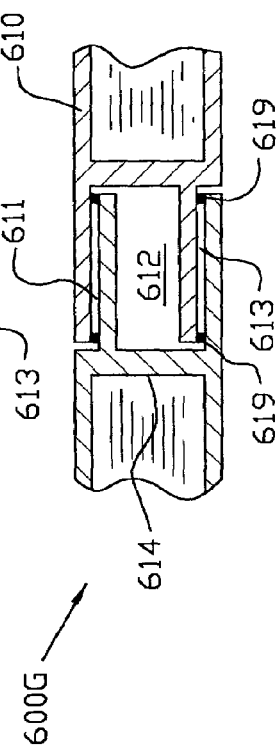
FIG. 6G illustrates a supplemental elastomeric seal arrangement.

FIG. 6G illustrates a supplemental elastomeric seal 619 between the vanes.

FIG. 7 is a perspective view 700 of the exterior side 701 of the male vane. The exterior surface of the male vane includes a convex curvature. Tapered stiffener 706 is illustrated as being wider at the leading edge 750 than at the trailing edge 751. Tapered stiffener 706 extends in a trapezoidal non parallel fashion from the leading edge 750 to the trailing edge 751. Exterior surface 701 and interior surface 705 are welded or otherwise permanently affixed to tapered stiffener 706. Preferably there are two tapered stiffeners but there may be one or four as illustrated in FIG. 4F.

Shoulder or groove 702 also extends as a non parallel leg of a trapezoid being wider at the trailing edge 751 than at the leading edge 750. The direction of flow with respect to the vane is from the leading edge toward the trailing edge.

Apertures or eyelets 708, 720, and 721 in tapered stiffener 706 are illustrated in FIG. 7. One or more of these eyelets may receive a shape memory alloy wire or rope depending on the specific need. Wire or ropes extending through eyelet 721 will produce a larger counter moment than a wire of the same dimension extended through eyelet 708. Eyelets include a nonconductive insulator 761 or standoff illustrated in FIG. 7D so that an electric current may pass through the wire or rope without grounding to the metal of the nozzle.

FIG. 7 further illustrates a land 703 formed by shoulder 702 in exterior surface 701 of the male vane. Land 703 and shoulder 702 extend the length of the vane such that there is a narrow land portion 703A proximate the leading edge 750 of the vane. Reference numeral 712 indicates a groove or slot which receives a reciprocal tongue of a female vane. Land 703 receives a reciprocal tongue of a female vane. Pivot 710 and opening 711 are illustrated in FIG. 7.

Still referring to FIG. 7, trailing edge 751 of the male vane includes a space or gap 707 formed by the termination of the interior 705 and exterior surface 701 which are affixed to the tapered stiffeners.

FIG. 7A is a perspective view 700A of the exterior side of the male vane similar to that illustrated in FIG. 7 with an optional access window 730. The access window 730 enables attachment, lacing and/or maintenance of the SMA wire 731, 732, and 733 through the vane. Another support stiffener 716 is illustrated in FIG. 7A together with apertures or eyelets 708A, 720A and 721A for easy assembly and disassembly.

FIG. 7B is a perspective view 700B of the interior side 705 of the male vane of FIG. 7 illustrating interior side 705 as not having any grooves and being substantially trapezoidally shaped. FIG. 7C is a side view 700C of the male vane illustrated in FIG. 7 with the curvature of the exterior surface illustrated.

Figure 8:
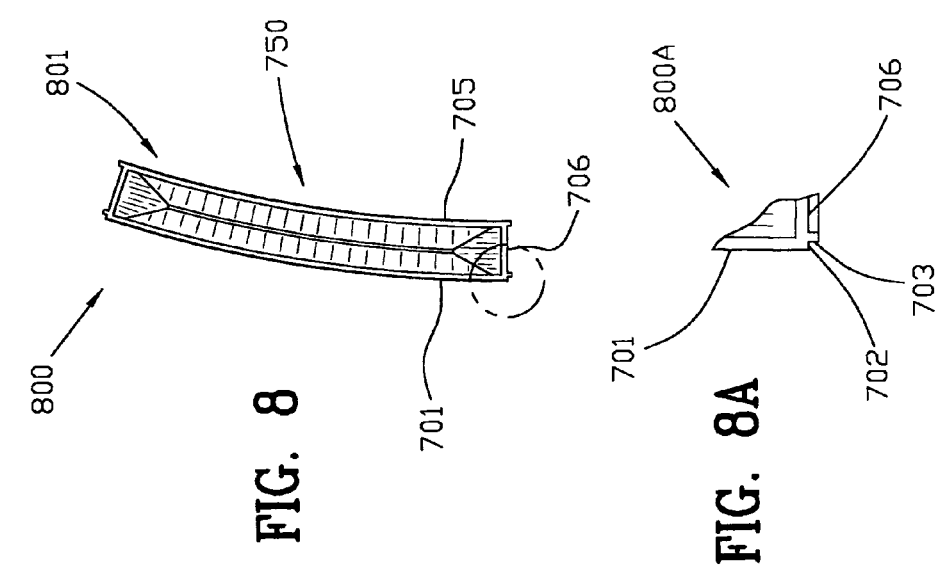
FIG. 8 is a view of the leading edge of the male vane taken along the lines 8-8 of FIG. 7 illustrating the inner or inside portion of the male vane.

FIG. 8 is a view 800 of the leading edge 750 of the male vane taken along the lines 8-8 of FIG. 7 illustrating the inner or inside portion 801 of the male vane. FIG. 8 does not illustrate the pivots so as to increase clarity of the illustration. Tapered stiffeners 706 and 716 are also illustrated in FIG. 8. FIG. 8A is an enlargement 800A of a portion of FIG. 8.

Figure 9:
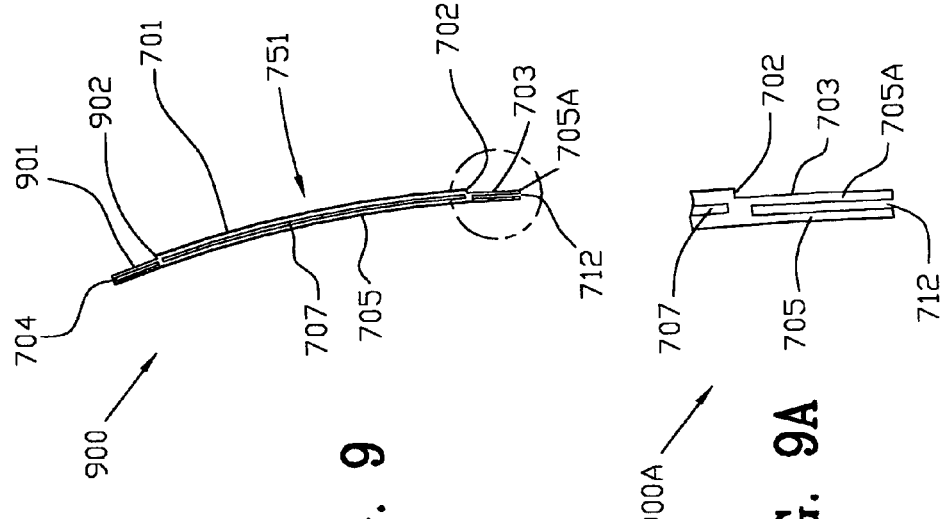
FIG. 9 is a view of the trailing edge of the male vane taken along the lines 9-9 of FIG. 7.

FIG. 9 is a view 900 of the trailing edge 751 of the male vane taken along the lines 9-9 of FIG. 7. FIG. 9A is an enlargement 900A of a portion of FIG. 9 which better illustrates the tongues 705, 705A and grooves 702, 712. The convex curvature of the exterior surface 701 is illustrated in FIGS. 7-9A.

FIG. 10 is a perspective view 1000 of the convexly shaped exterior 1001 of a substantially trapezoidally shaped female vane having a leading edge 1050 and a trailing edge 1051. Surface 1001 forms tongues 1007 and 1009 which interengage with corresponding grooves in the exterior of adjacent male vanes. Grooves 1011, 1014 and 1013, 1012 interengage corresponding tongues of adjacent male vanes. Lands 1008, 1010 are formed in the interior surface 1002 of the female vane by grooves 1011 and 1012. Opening or space 1006 is illustrated in the trailing edge 1051.

Still referring to FIG. 10, tapered stiffener 1003 supports exterior surface 1001 and interior surface 1002. Both surfaces 1001 and 1002 are affixed to the tapered stiffeners. Eyelets or apertures 1004, 1020, 1021 are illustrated in stiffener 1003 for receiving SMA or other type wire or rope for lacing the 9 pairs of male and female vanes together. As previously indicated, fewer or less vanes may be used about the 360 degree circumference of the gas turbine engine.

Figure 10B:
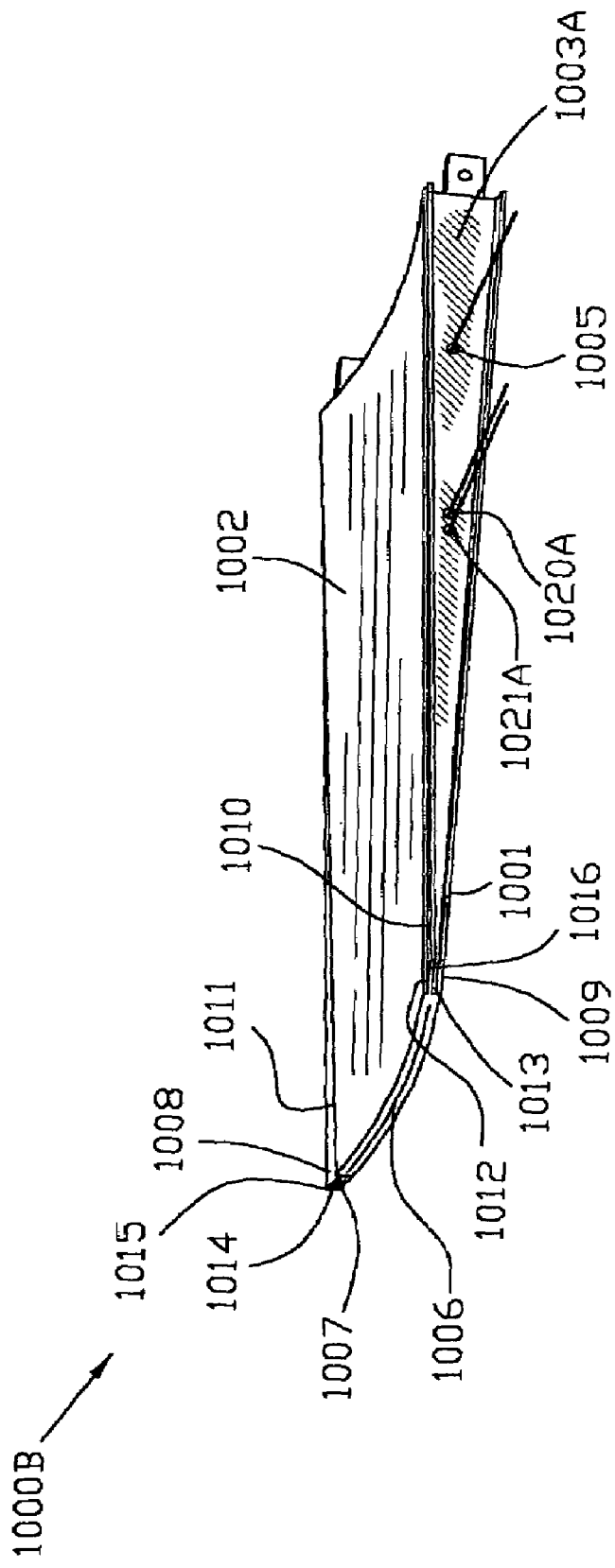
FIG. 10B is a perspective view of the interior of a female vane.

FIG. 10A is a perspective view 1000A of the exterior 1001 of a female vane similar to that illustrated in FIG. 10 with an optional access window 1030. Tapered stiffener 1003A is illustrated in FIG. 10A. FIG. 10B is a perspective view 1000B of the interior of a female vane illustrating grooves 1011 and 1012 in surface 1002 as well as lands 1008 and 1010.

FIG. 11 is a view of the leading edge 1050 of the female vane taken along the lines 11-11 of FIG. 10 illustrating the inner or inside portion 1101 of the female vane as well as the tapered stiffeners 1003 and 1003A. FIG. 11 does not illustrate the pivots so as to increase clarity of the illustration. FIG. 12 is a view of the trailing edge 1050 of the female vane taken along the lines 12-12 of FIG. 10 which illustrate the tongues 1007, 1009, 1015, 1016 and grooves 1008, 1012, 1014, 1016. FIG. 12A is an enlargement of a portion of FIG. 12. The convex curvature of surface 1001 is illustrated in FIGS. 10-12A.

Figure 13:
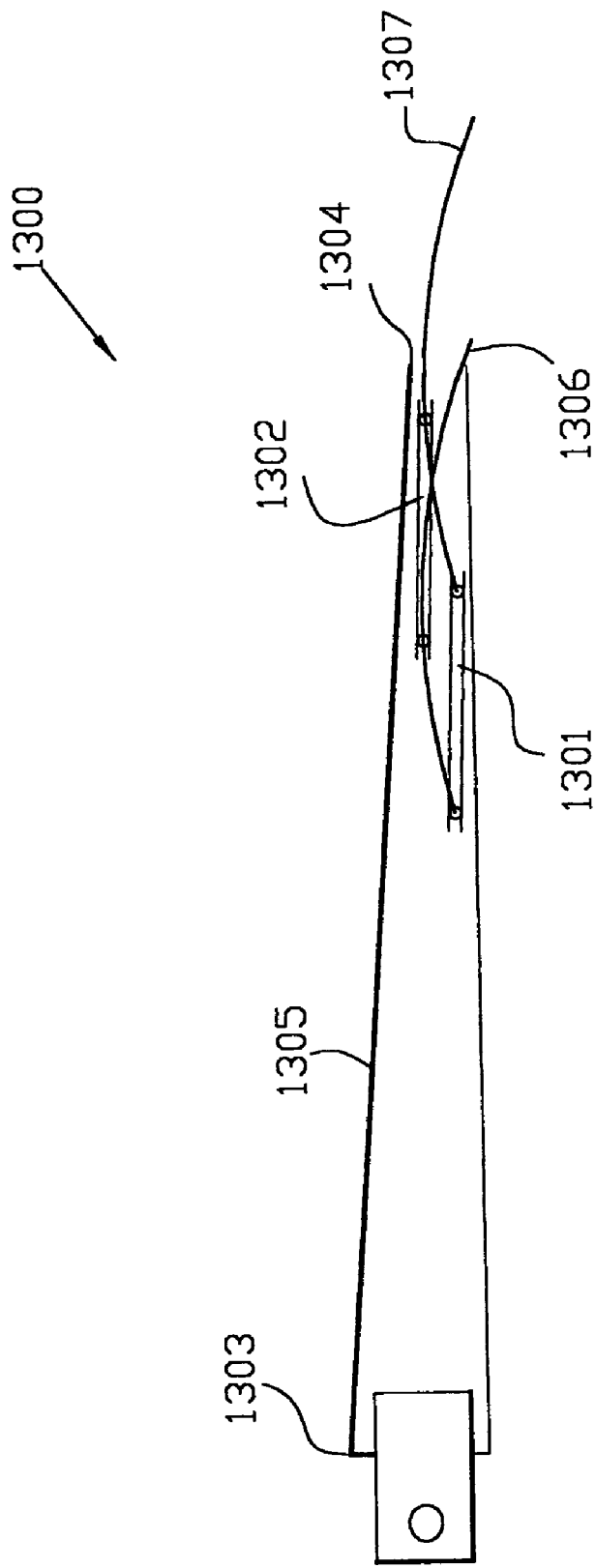
FIG. 13 is a schematic representation of a vane extender used to enhance noise reduction.

FIG. 13 is a schematic representation 1300 of a vane extender (vortex generator) 1306 for reducing noise from a gas turbine fan and/or engine exhaust. Tracks 1301 and 1302 reside within vane 1305. In this application vane 1306 is extended through the opening 1304 in the trailing edge of vane 1305. Leading edge 1303 and the remaining structure is similar to that described above. Vane extender 1306 is illustrated in and its extended position 1307 in FIG. 13. A drive mechanism be it mechanical or smart (not shown) drives and retracts the vane between its two positions.

Figure 14:
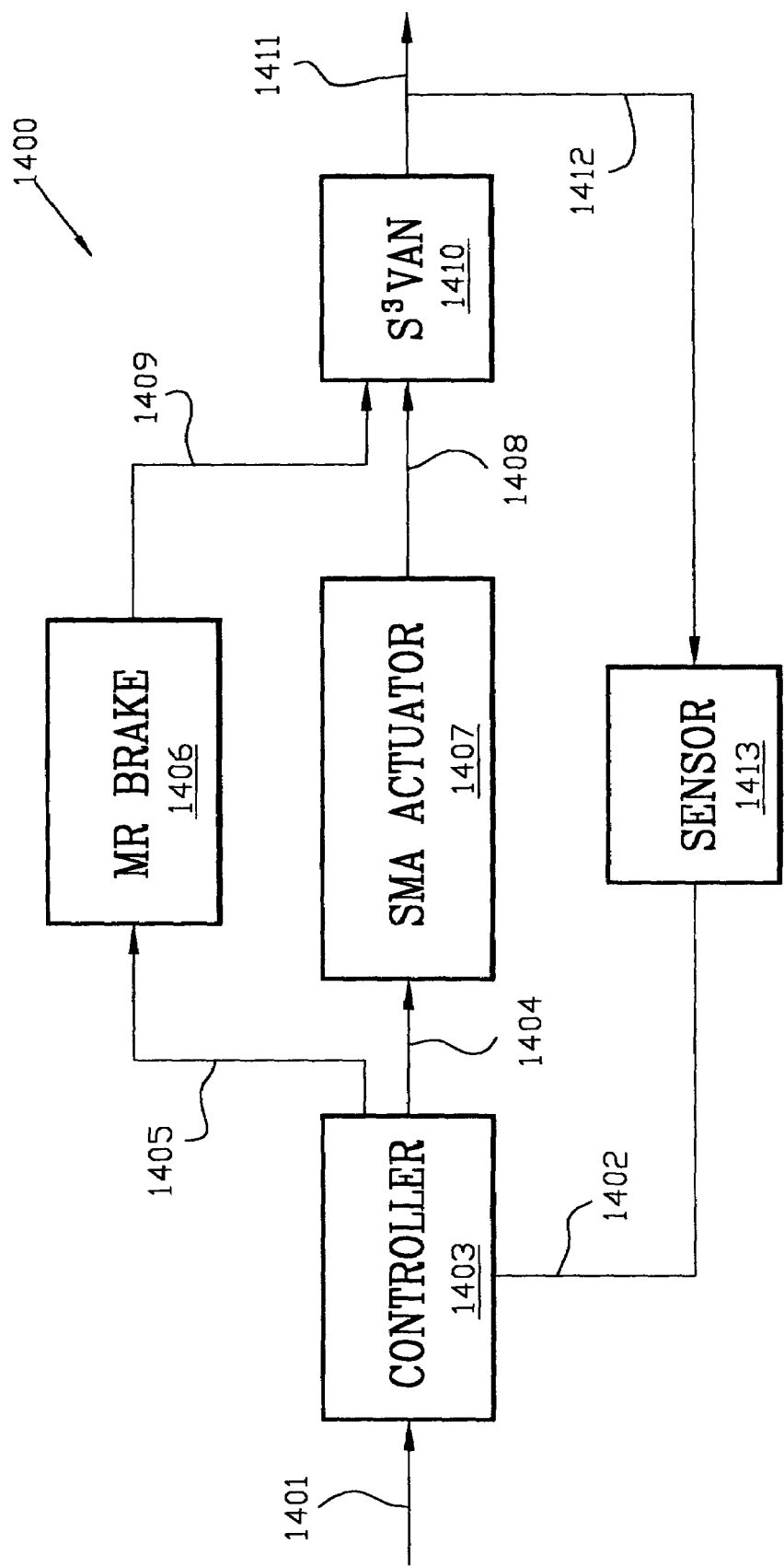
FIG. 14 is a block diagram of a control system for the controlling the variable area nozzle of the present invention.

FIG. 14 is a block diagram 1400 of a control system for controlling the position of the variable area nozzle 1410 of the present invention. Set point 1401 is inputted to controller 1403 and compared to a position feedback signal 1412 which is sensed by sensor 1413 and fed to the controller by line 1402. The controller 1403 outputs a position signal to the SMA actuator 1407 dictating the length and, hence, the position of the smart, self-sealing variable area nozzle 1410. The controller compensates for nonlinearities in the SMA actuator and the hardware including the spring openers in the variable area nozzle 1410. In parallel with the SMA actuator 1407 is magneto-rheological brake 1406 which locks the nozzle in a specified position, dampens mechanical vibrations in the nozzle, and controls the rate of change of position of the nozzle.

The SMA brake is fail safe such that loss of power to the brake renders it ineffectual.

The invention has been described herein by way of example only. Those skilled in the art will readily recognize that structural changes, method changes and material changes may be made to those disclosed herein without departing from the spirit and scope of the appended claims.

We claim:

1. A variable area nozzle comprising:
 a plurality of rotatable vanes; each of said vanes is rotatable with respect to a support; each of said vanes includes an interior surface and an exterior surface; each of said surfaces of said vanes includes a crowned contour; and, each of said vanes interengages another of said vanes sealing said vanes.

2. A variable area nozzle as claimed in claim 1 further comprising a nozzle closer for rotating said vanes toward minimum cross-sectional opening.

3. A variable area nozzle as claimed in claim 2 wherein said nozzle closer is comprised of an SMA wire.

4. A variable area nozzle as claimed in claim 3 wherein said nozzle closer further comprises nonconductive SMA standoffs for affixing said SMA wire within said vanes.

5. A variable area nozzle as claimed in claim 4 wherein said nozzle opener is a leaf spring.

6. A variable area nozzle as claimed in claim 2 wherein said nozzle closer is comprised of a plurality of SMA wires.

7. A variable area nozzle as claimed in claim 2 wherein said nozzle closer comprises a hydraulic actuator.

8. A variable area nozzle as claimed in claim 7 wherein said nozzle closer comprises a plurality of hydraulic actuators.

9. A variable area nozzle as claimed in claim 2 wherein said nozzle closer comprises a wire.

10. A variable area nozzle as claimed in claim 9 wherein said wire is metallic.

11. A variable area nozzle as claimed in claim 9 wherein said wire is synthetic.

12. A variable area nozzle as claimed in claim 11 wherein said nozzle opener is a spring.

13. A variable area nozzle as claimed in claim 11 wherein said nozzle opener is a coil spring.

14. A variable area nozzle as claimed in claim 1 further comprising a nozzle opener.

15. A variable area nozzle comprising:
a circumferential support;
a plurality of circumferentially arranged vanes rotatably mounted to said circumferential support;
each of said vanes includes a male tongue portion and a female groove portion; and,
said male tongue portion of each of said vanes interengages said female groove portion of each adjacent vane;
each of said vanes includes an interior surface and an exterior surface; and,
each of said surfaces of said vanes includes a crowned contour.

16. A variable area nozzle as claimed in claim 15 wherein said vanes are convexly contoured.

17. A variable area nozzle as claimed in claim 16 wherein said vanes rotate uniformly and concentrically.

18. A variable area nozzle as claimed in claim 15 wherein said male tongue portion of said vanes seal against said female groove portions of said adjacent vanes.

19. A variable area nozzle comprising:
a concentric support;
a plurality of convexly contoured vanes circumferentially and rotatably mounted to said concentric support forming a nozzle positionable between a first position corresponding to a minimum area nozzle and a second position corresponding to a maximum area nozzle; and,
each of said plurality of convexly contoured vanes engages an adjacent vane sealing said nozzle in a vane to vane sealing arrangement in all positions between and including said first position corresponding to a minimum area nozzle and a second position corresponding to a maximum area nozzle.

20. A variable area nozzle as claimed in claim 19 in combination with a nacelle of a gas turbine.

21. A variable area nozzle as claimed in claim 19 in combination with a core of a gas turbine.

22. A variable area nozzle as claimed in claim 19 in combination with a hydraulic discharge line.

23. A variable area nozzle as claimed in claim 19 further comprising a closer.

24. A variable area nozzle as claimed in claim 23 wherein said closer is an SMA wire.

25. A variable area nozzle as claimed in claim 23 wherein said closer is comprised of a plurality of SMA wires which form an SMA rope.

26. A variable area nozzle as claimed in claim 23 wherein said closer is a wire.

27. A variable area nozzle as claimed in claim 23 wherein said closer is comprised of a plurality of wires.

28. A variable area nozzle as claimed in claim 23 wherein said closer is a hydraulic actuator.

29. A variable area nozzle as claimed in claim 19 further comprising an opener.

30. A variable area nozzle as claimed in claim 29 wherein said opener is a spring.

31. A variable area nozzle as claimed in claim 30 wherein said opener is a leaf spring.

32. A variable area nozzle as claimed in claim 30 wherein said opener is a coil spring.

33. A variable area nozzle as claimed in claim 19 further comprising a rotary damper.

34. A variable area nozzle as claimed in claim 33 wherein said rotary damper is a magneto-rheological fluid device.

35. A variable area nozzle as claimed in claim 33 wherein said rotational brake is a magneto-rheological brake.

36. A variable area nozzle as claimed in claim 19 further comprising a rotational brake.

37. A variable area nozzle comprising:
a concentric support; and,
a plurality of convexly contoured vanes circumferentially and rotatably mounted to said concentric support forming a nozzle positionable between a first position corresponding to a minimum area nozzle and a second position corresponding to a maximum area nozzle; each of said plurality of convexly contoured vanes includes a seal which engages an adjacent vane sealing said nozzle in a vane to vane sealing arrangement in all positions between and including said first position corresponding to a minimum area nozzle and a second position corresponding to a maximum area nozzle.

38. A variable area nozzle as claimed in claim 37 wherein said seal is a metal seal.

39. A variable area nozzle as claimed in claim 37 wherein said seal is a labyrinth seal.

40. A variable area nozzle as claimed in claim 37 wherein said seal is a brush seal.

41. A variable area nozzle as claimed in claim 37 wherein said seal is a hydrostatic seal.

42. A variable area nozzle as claimed in claim 37 wherein said seal is an elastomeric seal.

43. A variable area nozzle as claimed in claim 37 wherein each of said plurality of convexly contoured vanes reside adjacent and interengage two of said vanes; and, wherein said vanes extend 360 degrees around said concentric support.

44. A variable area nozzle as claimed in claim 43 wherein said vanes include longitudinal supports and wherein openers act between said supports of adjacent vanes.

45. A variable area nozzle as claimed in claim 43 wherein said vanes include longitudinal supports and wherein openers are positioned and act between vanes spaced 60 degrees apart.

46. A variable area nozzle as claimed in claim 45 wherein each of said vanes urge adjacent vanes to rotate concentrically about said concentric support.

47. A variable area nozzle as claimed in claim 37 wherein each of said convexly contoured vanes has a length, and, said lengths of said convexly contoured vanes varying from vane to vane.

48. A variable area nozzle as claimed in claim 47 wherein said vanes comprise a leading edge, a trailing edge, an inner surface, an outer surface, and an extender residing between said inner surface and said outer surface and being longitudinally and moveably extendable beyond said trailing edge.

49. A variable area nozzle as claimed in claim 37 wherein said plurality of vanes includes male vanes and female vanes adjacent said male vanes.

50. A variable area nozzle as claimed in claim 49 wherein said male and female vanes each include reciprocal tongues and grooves.

51. A variable area nozzle as claimed in claim 50 wherein said male and female vanes each include an interior and an exterior.

52. A variable area nozzle as claimed in claim 51 wherein: said interior of said male vanes includes a tongue; said interior of said female vanes includes a groove; said exterior of said male vanes includes a groove and said exterior of said female vanes includes a tongue; said tongues of said interior of said male vane interengage said grooves of said interior of said female vanes; said tongues of said exterior of said female vanes interengage said grooves of said exterior of said male vanes; said male vanes include a main groove and a main tongue; said female vanes include a main groove and main tongue; and, said main tongues of said male and female vanes interengage said main grooves of said male and female vanes.

53. A variable area nozzle as claimed in claim 50 wherein said tongues and said grooves of said male and female vanes comprise a metal to metal seal.

54. A variable area nozzle as claimed in claim 50 wherein said tongues and said grooves of said male and female vanes comprise a labyrinth seal.

55. A variable area nozzle as claimed in claim 50 further comprising an elastomeric seal proximate each tongue and groove of each said male and female vanes.

56. A variable area nozzle as claimed in claim 50 further comprising a hydrostatic seal proximate each tongue and groove of each said male and female vanes.

57. A variable area nozzle as claimed in claim 50 further comprising a brush seal proximate each tongue and groove of each said male and female vanes.

58. A variable area nozzle comprising:
a concentric support;
a plurality of convexly contoured vanes;
each of said convexly contoured vanes has a length, said lengths of said convexly contoured vanes being nonuniform; and,
said plurality of convexly contoured vanes circumferentially and rotatably mounted to said concentric support forming a nozzle positionable between a first position corresponding to a minimum area nozzle and a second position corresponding to a maximum area nozzle.

59. A variable area nozzle for use in a gas turbine engine comprising:
a support;
a plurality of vanes rotatably moveable with respect to said support forming a number of frustum-shaped conic sections between an area of minimum cross section to an area of maximum cross section; and,
each of said vanes is rotatable with respect to said support; each of said vanes includes an interior surface and an exterior surface; each of said surfaces of said vanes includes a crowned contour.

60. A variable area nozzle comprising:
a support;
a plurality of substantially trapezoidally shaped vanes circumferentially and rotatably mounted to said support forming a nozzle positionable between a first position corresponding to a minimum area nozzle and a second position corresponding to a maximum area nozzle;
each of said trapezoidally shaped vanes is rotatable with respect to said support; each of said trapezoidally shaped vanes includes an interior surface and an exterior surface; each of said surfaces of said trapezoidally shaped vanes includes a crowned contour; and,
each of said plurality of said substantially trapezoidally shaped vanes engages an adjacent vane creating a dual seal; said nozzle being sealed in all positions between and including said first position corresponding to a minimum area nozzle and said second position corresponding to a maximum area nozzle.

* * * * *

UNITED STATES PATENT AND TRADEMARK OFFICE
CERTIFICATE OF CORRECTION

PATENT NO. : 7,458,221 B1  
APPLICATION NO. : 10/693850  
DATED : December 2, 2008  
INVENTOR(S) : Arnold et al.

Page 1 of 1

It is certified that error appears in the above-identified patent and that said Letters Patent is hereby corrected as shown below:

Col. 5, line 8, after "The" delete "magneto-Theo-logical" and insert --magneto-rheological--.

Signed and Sealed this

Thirteenth Day of January, 2009

JON W. DUDAS  
*Director of the United States Patent and Trademark Office*

UNITED STATES PATENT AND TRADEMARK OFFICE
CERTIFICATE OF CORRECTION

PATENT NO.       : 7,458,221 B1
APPLICATION NO.  : 10/693850
DATED            : December 2, 2008
INVENTOR(S)      : Arnold et al.

It is certified that error appears in the above-identified patent and that said Letters Patent is hereby corrected as shown below:

On the Title page, after Item "(54) VARIABLE AREA NOZZLE" delete "INCLUDING A PLURALITY OF CONVEXLY VANES WITH A CROWNED CONTOUR, IN A VANE TO VANE SEALING ARRANGEMENT AND WITH NONUNIFORM LENGTHS".

Col. 1, lines 1-5, after "NOZZLE" delete "INCLUDING A PLURALITY OF CONVEXLY VANES WITH A CROWNED CONTOUR, IN A VANE TO VANE SEALING ARRANGEMENT AND WITH NONUNIFORM LENGTHS".

Signed and Sealed this

First Day of December, 2009

David J. Kappos
*Director of the United States Patent and Trademark Office*